(12) United States Patent
Aucoin et al.

(10) Patent No.: US 11,274,850 B2
(45) Date of Patent: Mar. 15, 2022

(54) SYSTEMS AND METHODS FOR FLOW ESTIMATION USING DIFFERENTIAL PRESSURE SENSOR ACROSS VALVE

(71) Applicant: Johnson Controls Technology Company, Auburn Hills, MI (US)

(72) Inventors: Camille M. Aucoin, Milwaukee, WI (US); Brennan H. Fentzlaff, Oconomowoc, WI (US); Homero L. Noboa, Waukesha, WI (US); Duane S. Freimuth, Franklin, WI (US); Kirk H. Drees, Cedarburg, WI (US); Kenneth J. Sieth, Delafield, WI (US); Justin M. Salerno, Menomonee Falls, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 17 days.

(21) Appl. No.: 16/418,887

(22) Filed: May 21, 2019

(65) Prior Publication Data
US 2019/0353385 A1    Nov. 21, 2019

Related U.S. Application Data

(60) Provisional application No. 62/674,386, filed on May 21, 2018.

(51) Int. Cl.
*F24F 11/74* (2018.01)
*F24F 11/63* (2018.01)
(Continued)

(52) U.S. Cl.
CPC .......... *F24F 11/74* (2018.01); *F16K 37/0091* (2013.01); *F24F 11/30* (2018.01);
(Continued)

(58) Field of Classification Search
CPC .......... Y10T 137/776; Y10T 137/7761; F16K 37/0091; G01F 1/34; G01F 1/46;
(Continued)

(56) References Cited

U.S. PATENT DOCUMENTS

| | | | | |
|---|---|---|---|---|
| 3,706,320 A | * | 12/1972 | Kalsi | G05D 16/163 137/487 |
| 4,277,832 A | * | 7/1981 | Wong | G05D 7/0635 137/487 |

(Continued)

OTHER PUBLICATIONS

U.S. Appl. No. 16/251,011, filed Jan. 17, 2019, Johnson Controls, Inc.

(Continued)

*Primary Examiner* — William M McCalister
(74) *Attorney, Agent, or Firm* — Foley & Lardner LLP

(57) ABSTRACT

A system for controlling a flow rate of a fluid through a valve is provided. The system includes a valve and an actuator. An actuator drive device is driven by an actuator motor and is coupled to the valve for driving the valve between multiple positions. The system further includes a differential pressure sensor configured to measure a differential pressure across the valve and a controller that is communicably coupled with the differential pressure sensor and the motor. The controller is configured to receive a flow rate setpoint and the differential pressure measurement, determine an estimated flow rate based on the differential pressure measurement, determine an actuator position setpoint using the flow rate setpoint and the estimated flow rate, and operate the motor to drive the drive device to the actuator position setpoint.

12 Claims, 25 Drawing Sheets

(51) Int. Cl.
*F24F 11/30* (2018.01)
*G01F 1/34* (2006.01)
*G05D 23/19* (2006.01)
*F16K 37/00* (2006.01)
*F24F 110/40* (2018.01)

(52) U.S. Cl.
CPC .............. *F24F 11/63* (2018.01); *G01F 1/34* (2013.01); *G05D 23/1931* (2013.01); *F24F 2110/40* (2018.01); *Y10T 137/7761* (2015.04)

(58) Field of Classification Search
CPC .......... G01F 1/50; G01F 1/363; G01F 15/003; G01F 15/005; G05D 7/0623; G05D 7/0635; G05D 23/1931; G05D 23/1919; F24F 11/30; F24F 11/63; F24F 11/74; F24F 2110/40; F24F 2140/10
USPC .............................................. 137/487, 487.5
See application file for complete search history.

(56) References Cited

U.S. PATENT DOCUMENTS

| | | | |
|---|---|---|---|
| 6,352,106 B1* | 3/2002 | Hartman | G05D 23/1931 165/293 |
| 9,528,865 B2* | 12/2016 | Freund | G01F 1/34 |
| 9,952,074 B2 | 4/2018 | Freund et al. | |
| 2005/0016592 A1* | 1/2005 | Jeromson | F16K 37/0083 137/487.5 |
| 2005/0288873 A1* | 12/2005 | Urdaneta | G05D 7/0635 137/487.5 |
| 2009/0222124 A1* | 9/2009 | Latwesen | F16K 37/0083 700/110 |
| 2013/0153062 A1* | 6/2013 | Young | F23N 1/002 137/557 |
| 2013/0153798 A1* | 6/2013 | Kucera | F23N 1/002 251/129.01 |
| 2014/0097367 A1* | 4/2014 | Burt | F24D 19/1015 251/129.04 |
| 2017/0003150 A1* | 1/2017 | Noboa | F25B 13/00 |
| 2017/0335992 A1* | 11/2017 | Daraiseh | F16K 37/0091 |

OTHER PUBLICATIONS

U.S. Appl. No. 15/908,041, filed Feb. 28, 2018, Johnson Controls Technology Company.

* cited by examiner

SYSTEMS AND METHODS FOR FLOW ESTIMATION USING DIFFERENTIAL PRESSURE SENSOR ACROSS VALVE

CROSS-REFERENCE TO RELATED PATENT APPLICATION

This application claims the benefit of and priority to U.S. Provisional Patent Application No. 62/674,386 filed May 21, 2018, the entire disclosure of which is incorporated by reference herein.

BACKGROUND

The present disclosure relates generally to building management systems and associated devices and more particularly to an electronic pressure-independent control valve that uses a differential pressure sensor for feedback control.

The HVAC industry is moving towards the use of control valves capable of maintaining desired water flows regardless of time-varying pressure conditions in the pipes. Some valves are part of a control loop that includes a flow rate sensor that measures the flow rate and sends a signal to a feedback controller. The feedback controller then sends a signal to an actuator to adjust the opening of the valve to achieve the desired flow rate. However, existing flow rate sensors may be expensive and may require substantial pipe length in order to accurately measure flow, thereby increasing the overall size of the control valve package. Alternative systems and methods for estimating the flow rate through a valve without employing a flow rate sensor are therefore desirable.

SUMMARY

One implementation of the present disclosure is a system for controlling a flow rate of a fluid through a valve. The system includes a valve and an actuator. An actuator drive device is driven by an actuator motor and is coupled to the valve for driving the valve between multiple positions. The system further includes a first differential pressure sensor configured to measure a first differential pressure across the valve and a controller that is communicably coupled with the first differential pressure sensor and the motor. The controller is configured to receive a flow rate setpoint and the first differential pressure measurement, determine an estimated flow rate based on the first differential pressure measurement, determine an actuator position setpoint using the flow rate setpoint and the estimated flow rate, and operate the motor to drive the drive device to the actuator position setpoint.

In some embodiments, the estimated flow rate is further based in part on an actuator feedback position and a valve flow coefficient.

In some embodiments, the system further includes a second differential pressure sensor configured to measure a second differential pressure across the valve. In other embodiments, the first differential pressure sensor is associated with a first range parameter and a first accuracy parameter, and the second differential pressure sensor is associated with a second range parameter and a second accuracy parameter. The first range parameter is not equal to the second range parameter, and the first accuracy parameter is not equal to the second accuracy parameter. In further embodiments, the first range parameter is smaller than the second range parameter, and the first accuracy parameter is associated with greater accuracy than the second accuracy parameter.

In some embodiments, the estimated flow rate is further based in part on the second differential pressure measurement. In other embodiments, determining the estimated flow rate includes combining the first differential pressure measurement and the second differential pressure measurement using a Kalman filtering technique. In still other embodiments, determining the estimated flow rate includes combining the first differential pressure measurement and the second differential pressure measurement using a weighted average technique.

In some embodiments, the valve includes a valve member and a valve body. The valve body includes a first circumferential ring located upstream of the valve member and a second circumferential ring located downstream of the valve member. Each of the first circumferential ring and the second circumferential ring is at least partially filled with a porous media. In other embodiments, the porous media is at least one of woven brass wire cloth and sintered porous brass.

Another implementation of the present disclosure is a method for controlling a flow rate of a fluid through a valve. The method includes receiving a flow rate setpoint, receiving a first differential pressure measurement from a first differential pressure sensor, determining an estimated flow rate based at least in part on the first differential pressure measurement, determining an actuator position setpoint for an actuator using the flow rate setpoint and the estimated flow rate, and driving the actuator to the actuator position setpoint. The actuator is coupled to the valve in order to drive the valve between multiple positions.

In some embodiments, the estimated flow rate is further based in part on an actuator feedback position and a valve flow coefficient.

In some embodiments, the method further includes receiving a second differential pressure measurement from a second differential pressure sensor. In other embodiments, the first differential pressure sensor is associated with a first range parameter and a first accuracy parameter, and the second differential pressure sensor is associated with a second range parameter and a second accuracy parameter. The first range parameter is not equal to the second range parameter, and the first accuracy parameter is not equal to the second accuracy parameter. In further embodiments, the first range parameter is smaller than the second range parameter, and the first accuracy parameter is associated with greater accuracy than the second accuracy parameter.

In some embodiments, determining the estimated flow rate includes combining the first differential pressure measurement and the second differential pressure measurement using a Kalman filtering technique. In other embodiments, determining the estimated flow rate includes combining the first differential pressure measurement and the second differential pressure measurement using a weighted average technique.

Yet another implementation of the present disclosure is a system for controlling a flow rate of a fluid through a valve. The system includes a valve and an actuator. The valve includes a valve body and a rotatable valve member configured to regulate a flow of fluid through a conduit. An actuator drive device is driven by an actuator motor and is coupled to the valve member for driving the valve member between multiple positions. The system further includes a first pressure sensor assembly situated in parallel with the valve, a second pressure sensor assembly situated in parallel with the valve and the first pressure sensor assembly, and a controller that is communicably coupled with the first pressure sensor assembly, the second pressure sensor assembly, and the motor. The controller is configured to receive a flow rate setpoint, a first pressure measurement from the first pressure sensor assembly, and a second pressure measurement from the second pressure sensor assembly. The controller is further configured to determine an estimated flow rate based on the first pressure measurement, the second pressure measurement, an actuator feedback position, and a valve flow coefficient. The controller is further configured to determine an actuator position setpoint using the flow rate setpoint and the estimated flow rate and to operate the motor to drive the drive device to the actuator position setpoint.

In some embodiments, at least one of the first pressure sensor assembly and the second pressure sensor assembly includes a pitot tube.

In some embodiments, the valve body includes a first circumferential ring located upstream of the valve member and a second circumferential ring located downstream of the valve member. Each of the first circumferential ring and the second circumferential ring is at least partially filled with a porous media.

DETAILED DESCRIPTION

Overview

Before turning to the FIGURES, which illustrate the embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, a system and method for estimating the flow through a valve using a differential pressure sensor is shown. Current methods of controlling a pressure-independent valve often utilize a flow sensor (e.g., an ultrasonic flow sensor) that captures flow rate measurements. However, the flow sensor be too expensive to implement in small valves and may require a large length of flow conduit upstream of the sensor location in order to ensure accurate measurements. Thus, the system and methods of the present disclosure utilize a differential pressure sensor to estimate the flow rate through the valve and to control the valve accordingly. The differential pressure sensor may be less expensive than the flow sensor, and may be placed in parallel to the valve, thereby permitting a smaller product package.

Building Management System and HVAC System

Figure 1:
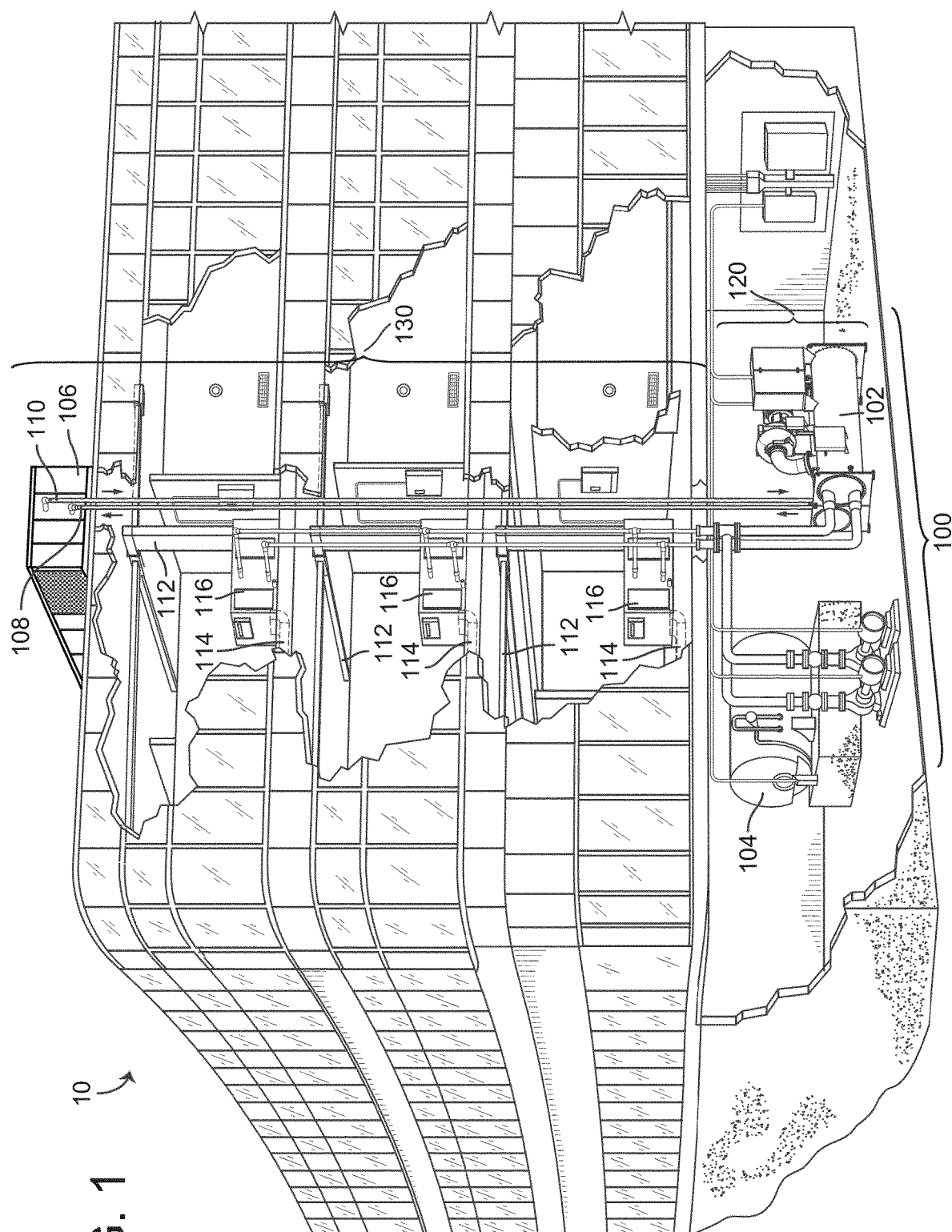
FIG. 1 is a perspective view of a building with a heating, ventilation, or air conditioning (HVAC) system and a building management system (BMS), according to some embodiments.

Referring now to FIGS. 1-4, an exemplary building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
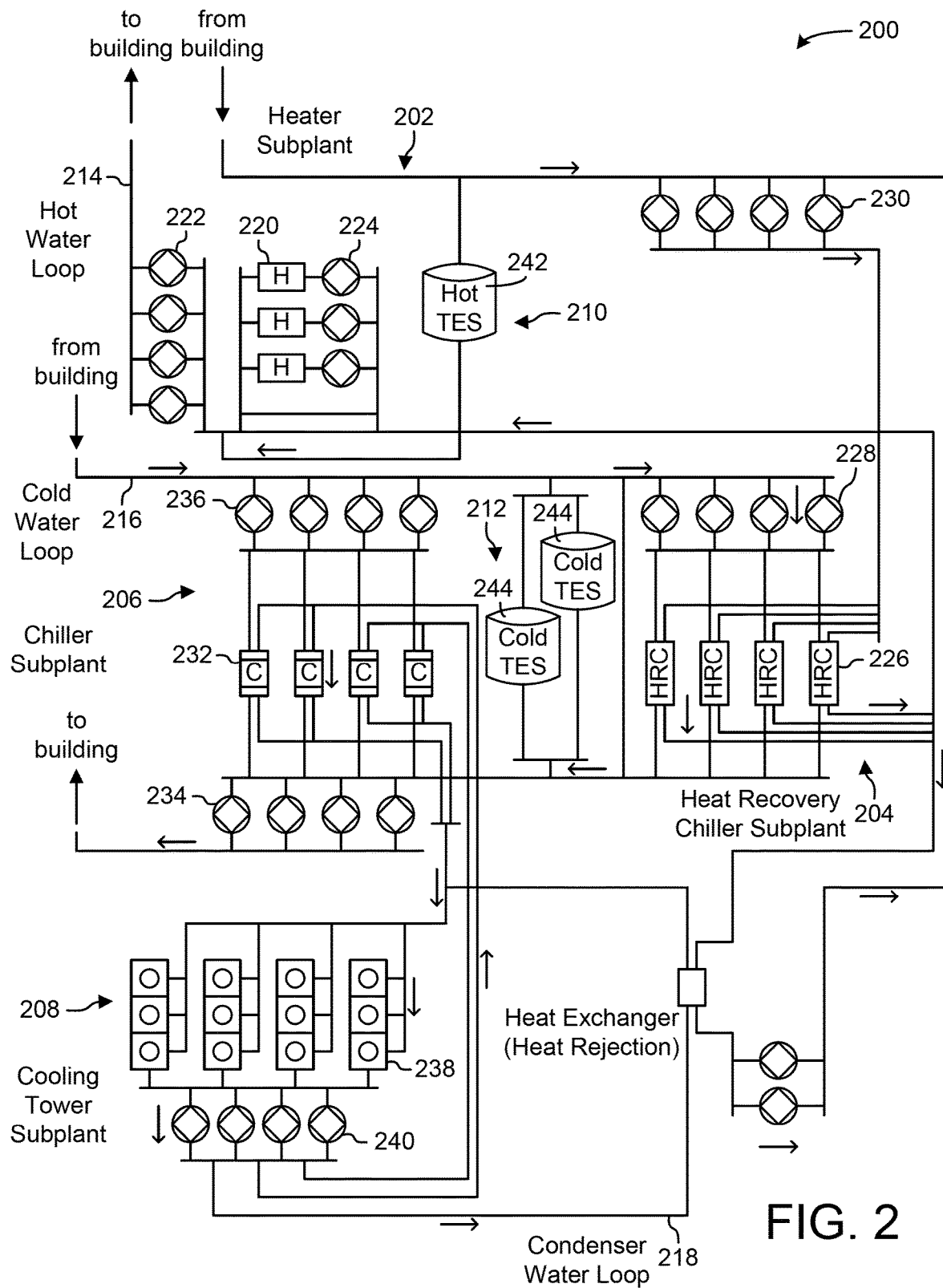
FIG. 2 is a schematic diagram of a waterside system which can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
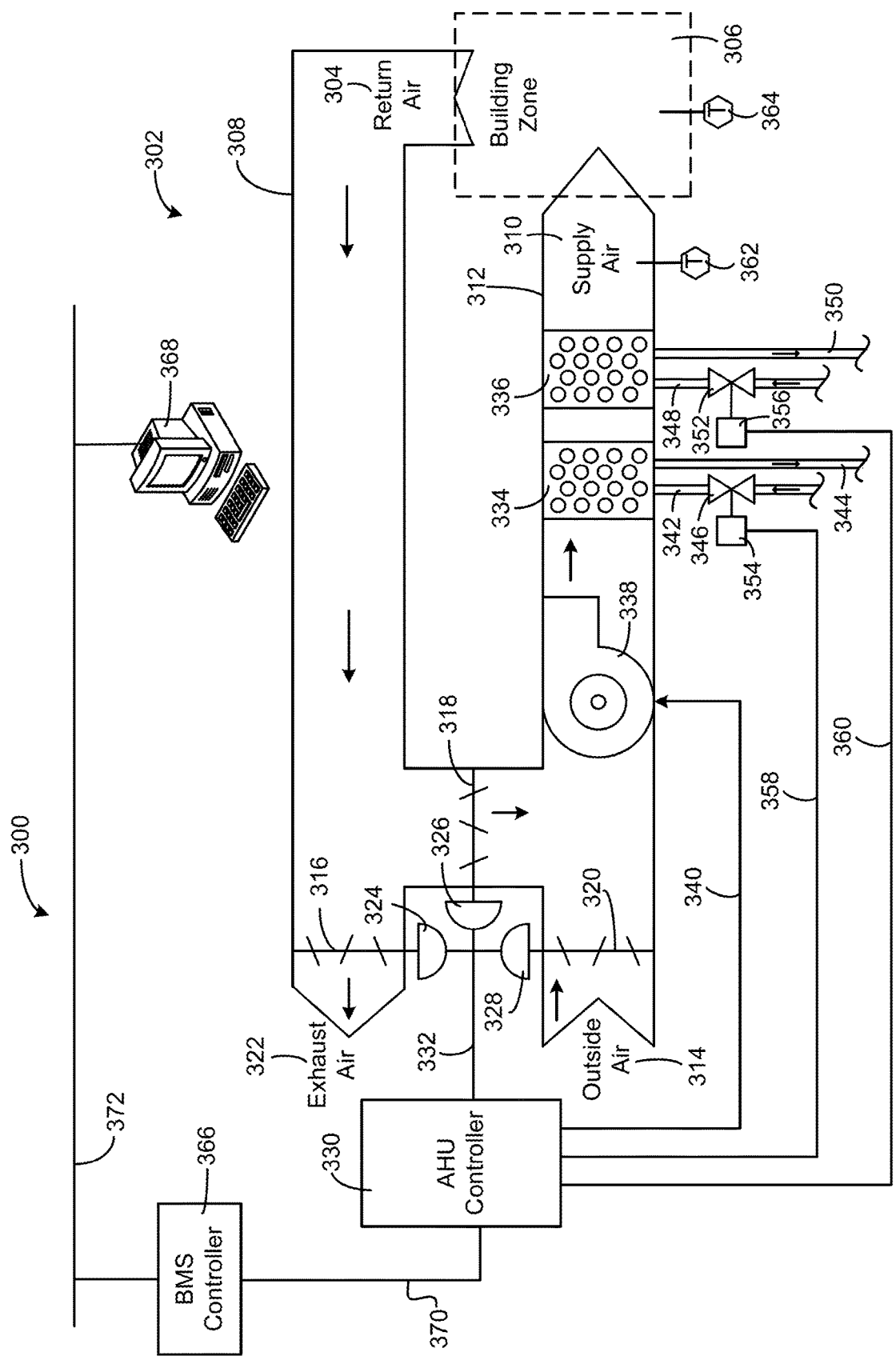
FIG. 3 is a block diagram of an airside system which can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
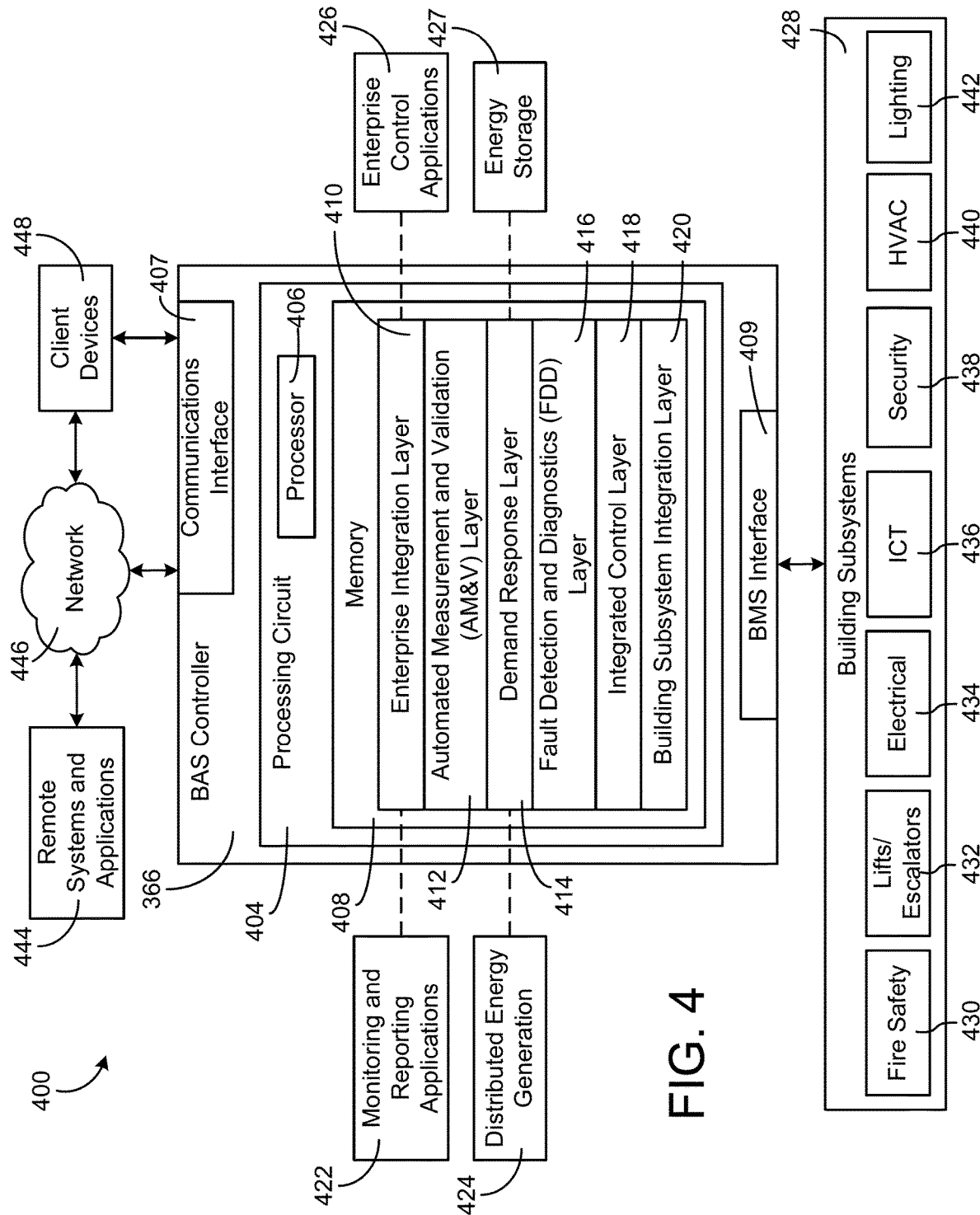
FIG. 4 is a block diagram of a BMS which can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Flow Estimation Using Differential Pressure Sensing

Figure 5:
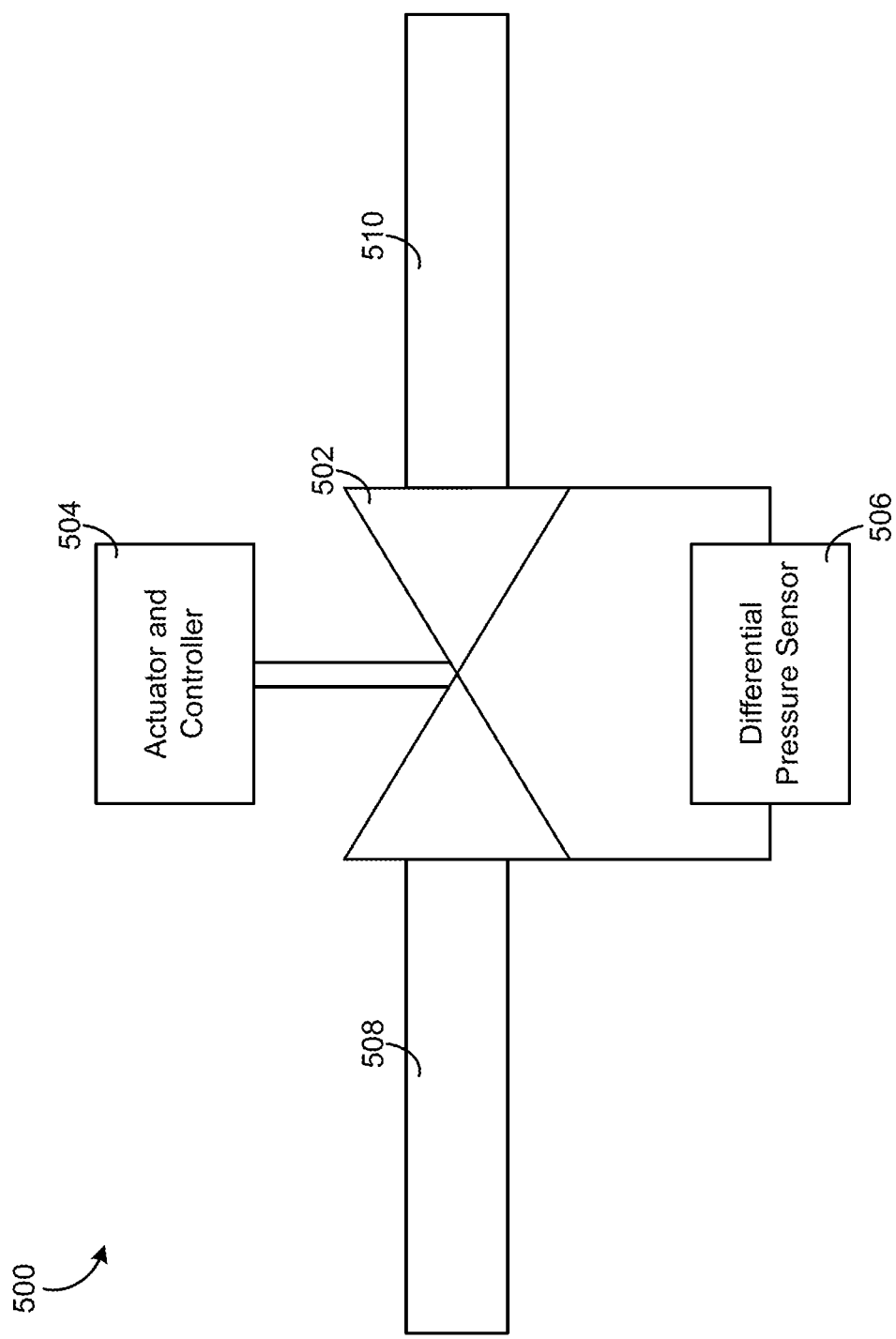
FIG. 5 is a block diagram of a valve device with a differential pressure sensor that can be implemented in the building of FIG. 1, according to some embodiments.

Turning now to FIG. 5, a block diagram of a valve assembly 500 that can be implemented in the building of FIG. 1 is shown, according to some embodiments. In some embodiments, the valve assembly is an electronic pressure-independent control valve (ePICV) configured to reject pressure fluctuations within a system. The valve assembly is shown to include a valve body 502 and an actuator with an integral controller 504. The valve body 502 and the actuator 504 may be situated between an upstream fluid conduit 508 and a downstream fluid conduit 510 such that fluid flows from the upstream fluid conduit 508, through the valve body 502, and into the downstream fluid conduit 510.

In various embodiments, the valve body 502 is a globe valve, a ball valve, a butterfly valve, or any other suitable type of valve with a variable area orifice. Similarly, in various embodiments, the actuator with integral control 504 may be any suitable type of actuator, including a linear actuator (e.g., a linear proportional actuator), a non-linear actuator, a spring return actuator, or a non-spring return actuator. The differential pressure sensor 506 is configured to measure the differential pressure across the valve body 502, and is therefore located in parallel with the valve body 502. For incompressible flow, the ideal Bernoulli equation relationship for pressure drop through a valve is:

$$\Delta P_{valve} = \frac{\rho}{2} k(\theta) v^2$$

where $\Delta P_{valve}$ is the differential pressure across the valve, $\rho$ is the density of the fluid, k is the relationship between the fluid momentum and the valve differential pressure, $\theta$ is the opening of the valve, and v is the fluid velocity through the valve.

The fluid velocity can be expressed in terms of the fluid's volumetric flow rate and the cross-sectional area of the opening:

$$v = \frac{q}{A(\theta)}$$

where q is the fluid's volumetric flow rate and A is the cross-sectional area as a function of the valve opening $\theta$. Substituting the fluid velocity equation into the Bernoulli equation yields the following:

$$\Delta P_{valve} = \frac{\rho}{2} k(\theta) \left( \frac{q}{A(\theta)} \right)^2$$

Rearranging terms produces the following:

$$\Delta P_{valve} = \frac{\rho}{2} \frac{k(\theta)}{A(\theta)^2} q^2$$

while lumping the $\rho$, k, and A terms yields:

$$\Delta P_{valve} = k'(\theta) q^2$$

where k' defines the relationship between the differential pressure across the valve and the volumetric flow rate through the valve. Flow coefficient $C_v$ is often utilized in industry to relate a valve's volumetric flow rate with the differential pressure applied to the valve. The relationship between $C_v$ and k' is as follows:

$$C_v = \frac{1}{\sqrt{k'}}.$$

Figure 6:
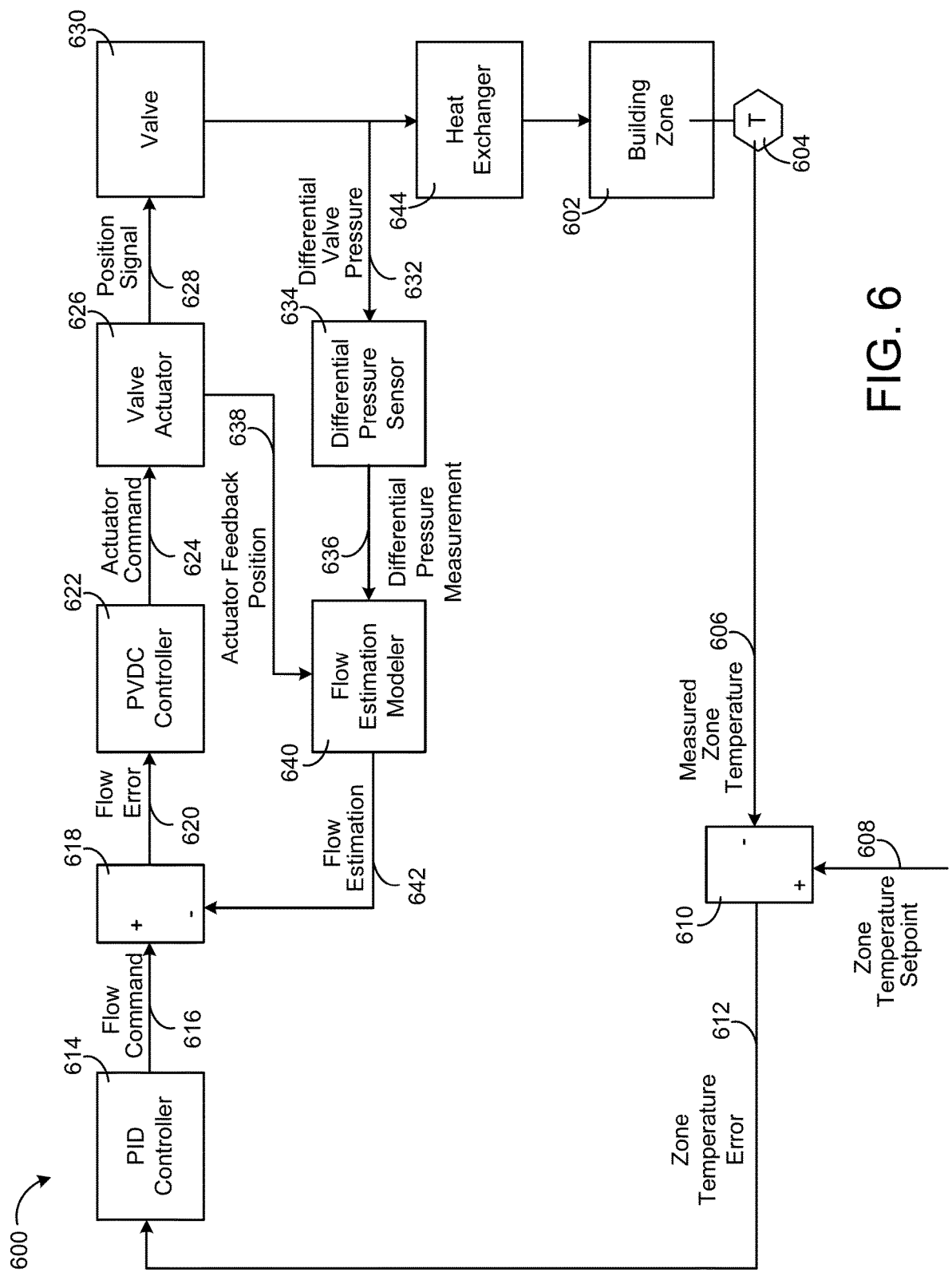
FIG. 6 is a block diagram of a system including a valve device with a differential pressure sensor in a closed-loop temperature control application, according to some embodiments.

Turning now to FIG. 6, a block diagram 600 of a valve device with a differential pressure sensor utilizing a closed-loop temperature control application is shown. Building zone 602 may be any subsection of a building (e.g., a room, a block of rooms, a floor). Measured zone temperature data 606 from temperature sensor 604 may be provided as an input signal to comparator 610. Comparator 610 may be configured to compare the measured zone temperature signal 606 with a zone temperature setpoint value 608 and output a zone temperature error signal 612. In various embodiments, comparator 610 may be a discrete electronics part or implemented as part of a controller device. The zone temperature error signal 612 may be received by a proportion-integral-derivative (PID) controller 614 configured to output a flow command 616. If comparator 610 determines that the measured zone temperature signal 606 is higher than the zone temperature setpoint value 608 (i.e., building zone 602 is hotter than the setpoint value), PID controller 614 may output a flow command 616 that causes valve actuator 626 to modify the flow rate through the heat exchanger 644 such that cooling to building zone 602 is increased. If comparator 610 determines that the measured zone temperature signal 606 is lower than the zone temperature setpoint value 608 (i.e., building zone 602 is cooler than the setpoint value), PID controller 614 may output a flow command 616 that causes valve actuator 626 to modify the flow rate through heat exchanger 644 such that heating to building zone 602 is increased. In various embodiments, controller 614 may be a different type of tuning or adaptive feedback controller other than a PID controller, for example, controller 614 may be a pattern recognition adaptive controller (PRAC), or a model recognition adaptive controller (MRAC).

Comparator 618 may compare the flow command 616 output received from the PID controller 614 with a flow estimation signal 642. The flow estimation signal 642 may be received from a flow estimation modeler 640. Further details of the flow estimation modeler 640 are included below and with reference to FIGS. 8-25. In various embodiments, comparator 618 may be a discrete electronics part or implemented as part of a controller (e.g., proportional variable deadband control (PVDC) controller 622). Comparator 618 may output a flow error signal 620 to PVDC controller 622. For example, if comparator 618 determines that the flow command signal 616 is higher than flow estimation signal 642, comparator 618 may generate a flow error signal 620 that causes PVDC controller 622 to operate valve actuator 626 to increase the flow through valve 630. Conversely, if comparator 618 determines that the flow command signal 616 is lower than flow estimation signal 642, comparator 618 may generate a flow error signal 620 that causes PVDC controller 622 to operate valve actuator 626 to decrease the flow through valve 630.

PVDC controller 622 is configured to receive flow error signal 620 from comparator 618 and to output an actuator command signal 624 to valve actuator 626 to drive the flow error signal 620 to zero (i.e., to operate valve actuator 626 such that the flow estimation signal 642 is equal to the flow command signal 616). Further details of proportional variable deadband control techniques are found in U.S. patent application Ser. No. 15/908,041 filed Feb. 15, 2018. The disclosure of U.S. patent application Ser. No. 15/908,041 is incorporated herein by reference in its entirety. In other embodiments, controller 622 may be a PRAC, a MRAC, or another type of tuning or adaptive feedback controller. In further embodiments, controller 622 operates using state machine or PID logic.

PVDC controller 622 may be configured to output an actuator command signal 624 (e.g., a DC signal, an AC signal) to valve actuator 626. In some embodiments, valve actuator 626 is identical or substantially similar to actuator 504, described above with reference to FIG. 5. Valve actuator 626 may include a drive device coupled to valve 630 and configured to rotate a valve member (e.g., a shaft) of valve 630. In some embodiments, valve 630 is identical or substantially similar to valve 502, described above. For example, in various embodiments, valve 630 is a globe valve, a ball valve, a butterfly valve, or any other type of valve with a variable fluid orifice.

Still referring to FIG. 6, block diagram 600 is further shown to include a differential pressure sensor 634 configured to measure the differential valve pressure 632 across valve 630 and output differential pressure measurement signal 636. In some embodiments, differential pressure sensor is identical or substantially similar to differential pressure sensor 506, described above with reference to FIG. 5. Once collected, the differential pressure measurement signal 636 may be provided to the flow estimation modeler 640. Using the differential pressure measurement signal 636, along with an actuator feedback position signal 638 from the valve actuator 626, the flow estimation modeler 640 is configured to generate a flow estimation signal 642 that is provided as an input to comparator 618. In some embodiments, the flow estimation modeler 640 and the comparator 618 are packaged within the same device. In other embodiments, the flow estimation modeler 640 and the comparator 618 are packaged as separate components. Further details of the development of the model used by flow estimation modeler 640 are included below with reference to FIGS. 8-25.

Fluid that passes through valve 630 may flow through heat exchanger 644. In some embodiments, valve 630 is used to modulate an amount of heating or cooling provided to the supply air for building zone 602. For example, heat exchanger 644 may be used to achieve zone setpoint temperature 608 for the supply air of building zone 602, or to maintain the temperature of supply air for building zone 602 within a setpoint temperature range. The position of valve 630 may affect the amount of heating or cooling provided to supply via heat exchanger 644 and may correlate with the amount of energy consumed to achieve a desired supply air temperature.

Figure 7:
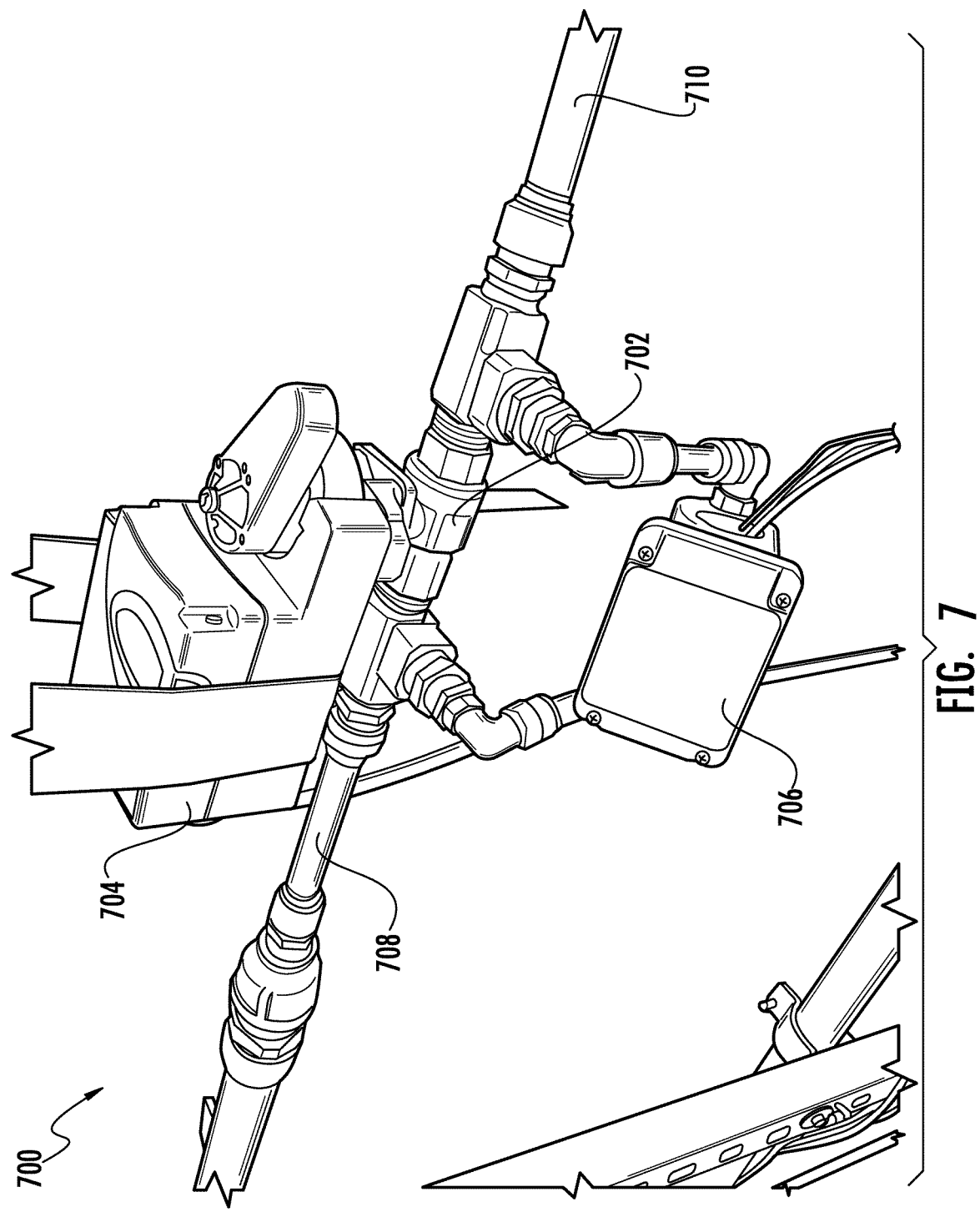
FIG. 7 is an image of a test setup of a valve device with a differential pressure sensor, according to some embodiments.

Referring now to FIG. 7, an image of a test setup 700 of an ePICV assembly is depicted. In some embodiments, test setup 700 may be utilized to take flow and differential pressure measurements to fit a model of k'(θ) to define the relationship between the differential pressure across the valve and the volumetric flow rate through the valve. In some embodiments, the model of k'(θ) may be utilized by the flow estimation modeler 640, described above with reference to FIG. 6, to generate a flow estimation signal 642. As shown, the test setup 700 may include each of the components depicted in the valve assembly 500 of FIG. 5. The valve body 702 may be configured to regulate a flow of fluid as it travels from an upstream fluid conduit 708 to a downstream fluid conduit 710. In some embodiments, the valve body 702 is a ½" two-way VG1000 series ball valve manufactured by Johnson Controls, Inc. with a verified maximum flow coefficient $$C_{v,max} = 6.4 \left[ \frac{gpm}{\sqrt{psi}} \right].$$

An actuator with integral controller 704 may be utilized to rotate a valve member of the valve body 702 and thereby vary the size of the fluid orifice of the valve body 702. In some embodiments, the actuator 704 is an electric non-spring return VA9300 series actuator manufactured by Johnson Controls, Inc. with a stroke time of 35 seconds.

Test setup 700 is further shown to include a differential pressure sensor 706. The differential pressure sensor 706 is configured to measure the differential pressure across the valve body 702. In some embodiments, the differential pressure sensor 706 is a true wet-to-wet differential pressure sensor model 230 manufactured by Setra. The test setup 700 may further include a reference flow sensor (not shown) configured to measure the flow rate through the valve body 702. Data from the reference flow sensor may be used both in identifying the valve's characteristic curve, and in validating the use of the differential pressure sensor to estimate valve flow. In some embodiments, the reference flow sensor is a ½" F-4600 series ultrasonic flow sensor manufactured by Onicon Incorporated.

The test procedure for test setup 700 may include varying the speed of a pump used to drive the fluid from the upstream fluid conduit 708 to the downstream fluid conduit 710. In some embodiments, the pump speed may vary from 30-60 Hz in increments of 10 Hz. At the same time, the test procedure may also include varying the position of the valve member within valve body 702 between a 0% open position and a 100% open position. In some embodiments, the valve position may be varied per the following specified increments:

Valve Position: [0, 10, (20:5:75), (80:2:84), 85, (86:2:94), 95, (96; 2:100)] %

Figure 8:
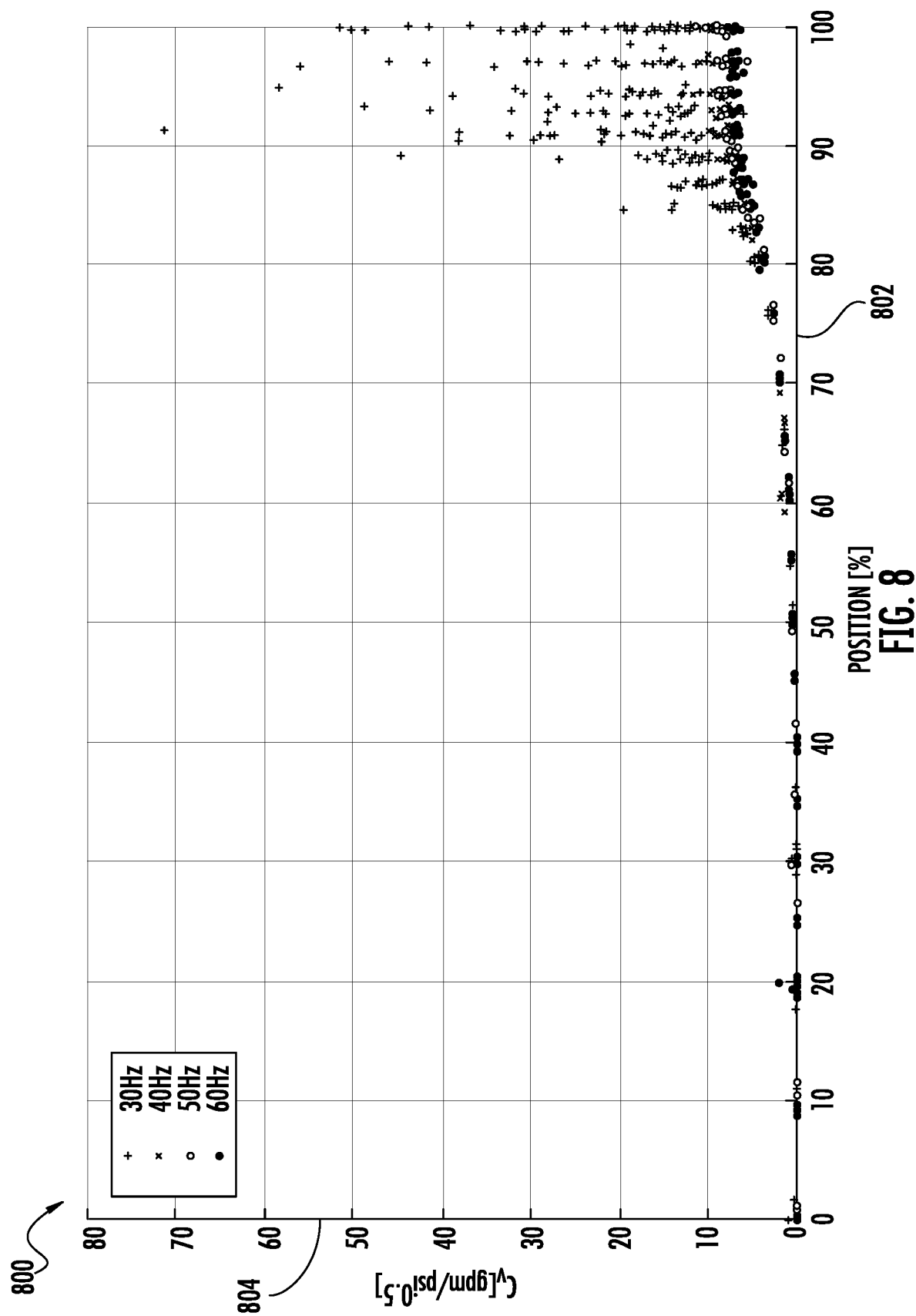
FIG. 8 is a plot of calculated valve flow coefficient values based on differential pressure, flow rate, and valve position test data, according to some embodiments.

Turning now to FIG. 8, plot 800 depicts calculated flow coefficient values based on differential pressure, flow rate, and valve position test data. The x-axis 802 represents the valve position in units of percent open (i.e., 0% refers to the valve member in a fully closed position, 100% refers to the valve member in a fully open position). The y-axis 804 represents the flow coefficient $C_v$ in imperial units (i.e., the flow of water through a valve at 60° F. in US gallons per minute (gpm) at a pressure drop of 1 pound per square inch (psi)). The simplest equation for the flow coefficient is as follows:

$$C_v = \dot{V}\sqrt{\frac{SG}{\Delta P}}$$

where $\dot{V}$ is the volumetric flow rate through the orifice, SG is the fluid's specific gravity, and ΔP is the pressure drop across the orifice. Because the test data was acquired using water as a process fluid (SG=1) and the values of $\dot{V}$ and ΔP were measured at various positions, it is possible to calculate the valve's $C_v$ value at the respective valve positions. As depicted in plot 800, at large valve openings (e.g., approximately greater than 80% open) and low pump speeds (e.g., 30 Hz), the calculated $C_v$ values have a much higher variance than smaller valve openings and higher pump speeds.

Figure 9:
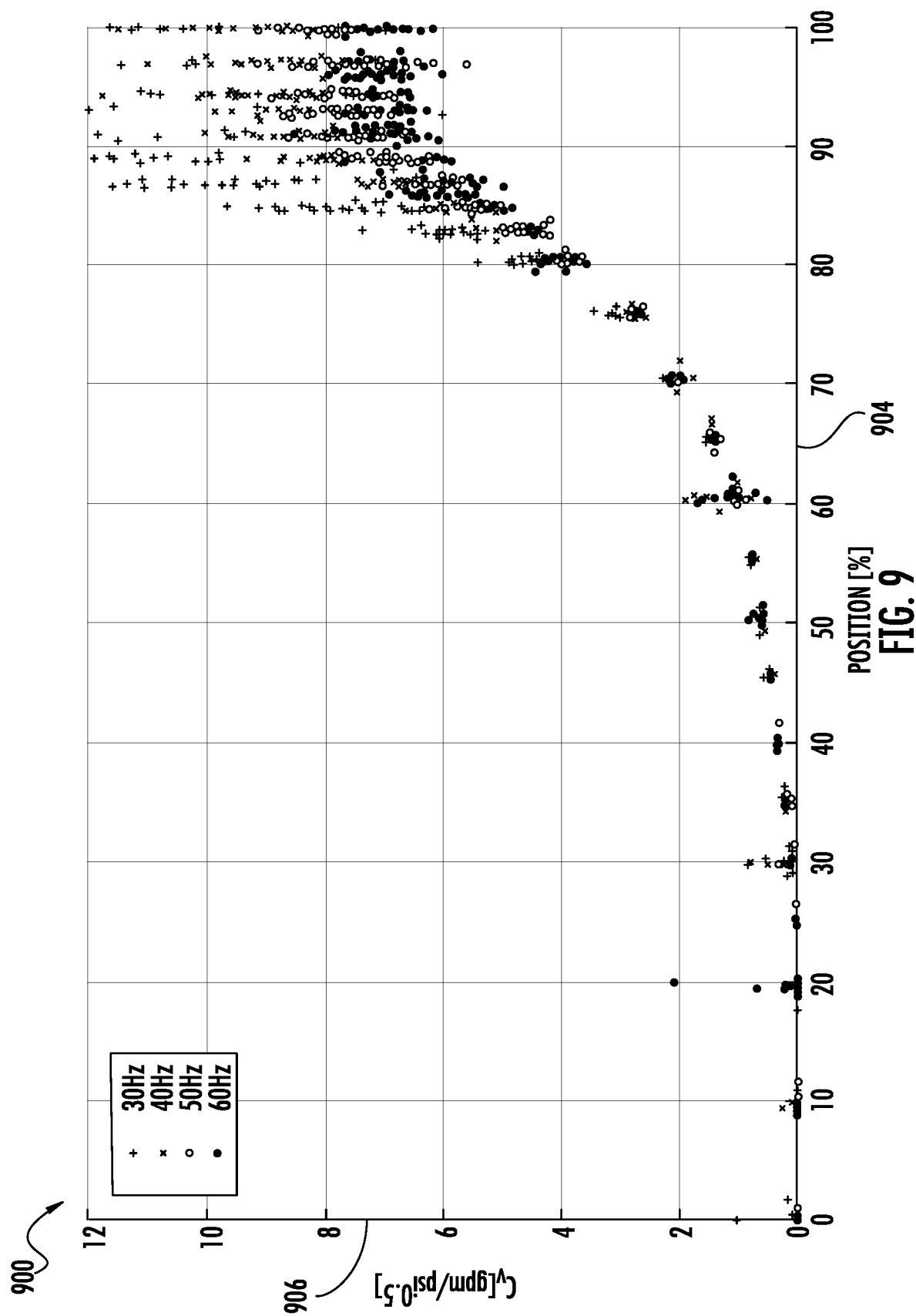
FIG. 9 is another plot of calculated valve flow coefficient values based on differential pressure, flow rate, and valve position test data, according to some embodiments.

Therefore, referring now to FIG. 9, plot 900 similarly depicts flow coefficient values on a y-axis 904 relative to a valve position represented on an x-axis 902. Plot 900 displays largely the same data as plot 800 but omits some of the 30 Hz data and truncates the span of the y-axis 904. As shown in plot 900, the calculated $C_v$ values are generally consistent across all pump speeds from 0% open to 70% open. At approximately 75% open, the 30 Hz $C_v$ data begins to diverge from the other pump speeds, and at greater than 80% open, higher pump speeds are correlated with lower $C_v$ values, which may be a result of the underlying physics of the flow regime through the valve (i.e., turbulence).

Since the uncertainty values of the $\dot{V}$ and $\Delta P$ measurements are known, they may be propagated to the $C_v$ values. Assuming the uncertainty values of the $\dot{V}$ and $\Delta P$ measurements are not correlated with each other, the uncertainty propagation equation is as follows:

$$u_{C_v} = \sqrt{\left(\frac{\partial C_v}{\partial \dot{V}}\right)^2 u_{\dot{V}}^2 + \left(\frac{\partial C_v}{\partial \Delta P}\right)^2 u_{\Delta P}^2}$$

where $$\frac{\partial C_v}{\partial x}$$

represents the partial derivative of $C_v$ with respect to measurement x and $u_x$ represents the x value's uncertainty. Each portion of the uncertainty equation is as shown below:

$$\frac{\partial C_v}{\partial \dot{V}} = \frac{1}{\Delta P}$$

$$u_{\dot{V}} = 0.01(\dot{V})$$

$$\frac{\partial C_v}{\partial \Delta P} = -\frac{1}{2}\dot{V}(\Delta P)^{-\frac{3}{2}}$$

$$u_{\Delta P} = 0.0025(50)$$

Figure 10:
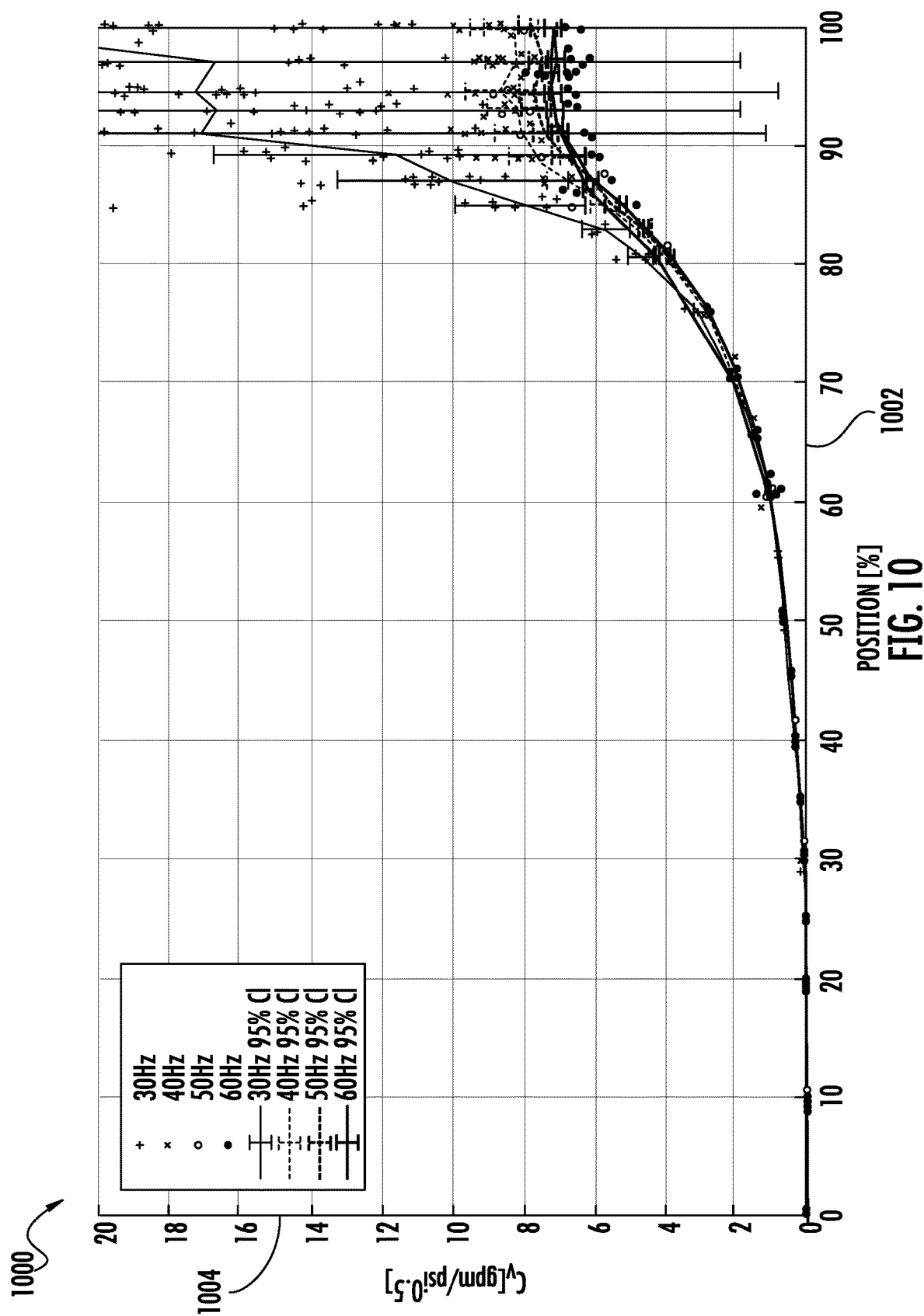
FIG. 10 is a plot of a characteristic valve flow coefficient curve with propagated uncertainty values, according to some embodiments.
Figure 11:
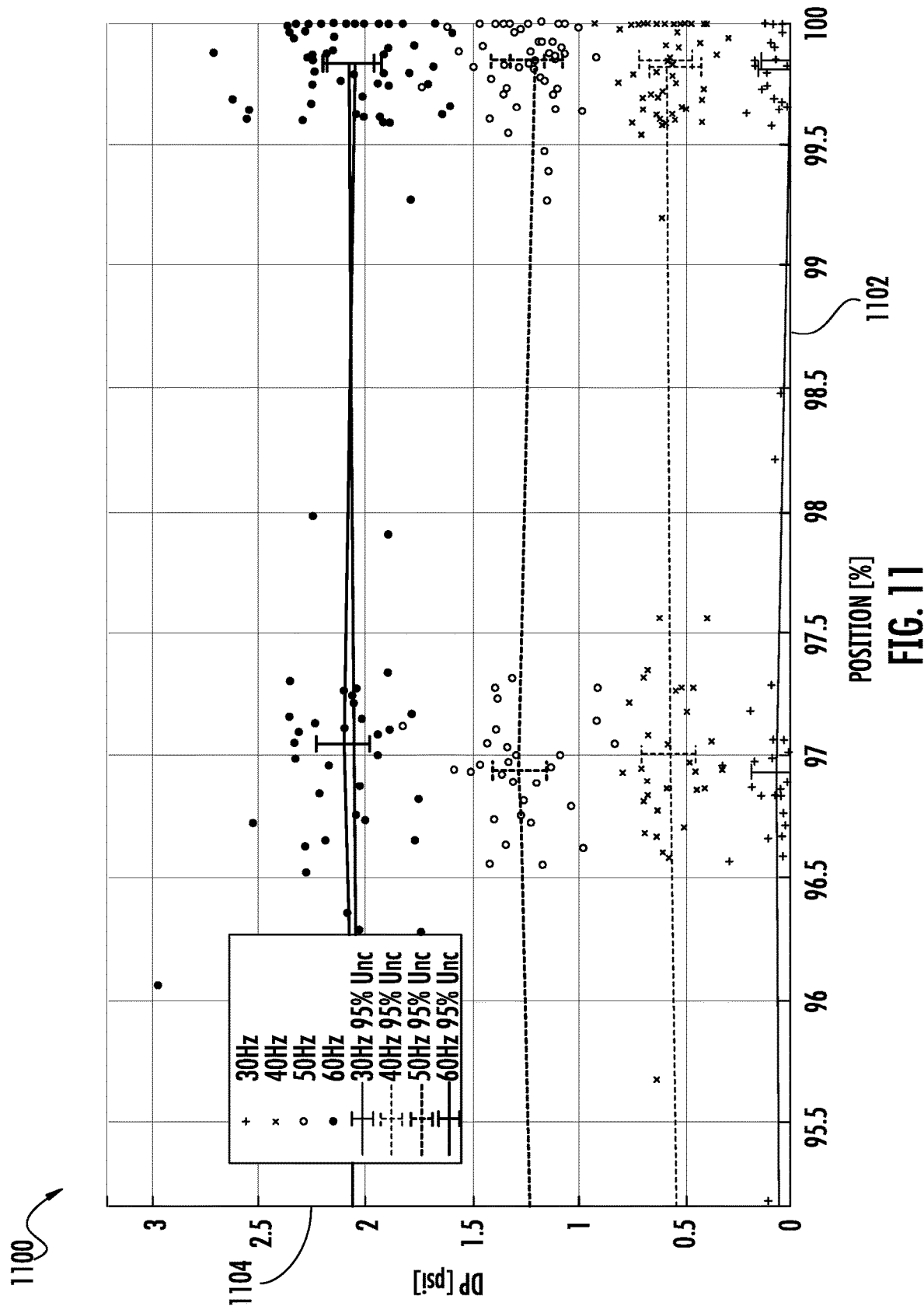
FIG. 11 is plot of differential pressure measurements with propagated uncertainty values, according to some embodiments.

Plot 1000 of FIG. 10 thus depicts the calculated $C_v$ values of plot 900 on y-axis 1004 relative to valve position represented on x-axis 1002, as well as the propagated uncertainty bands for the calculated $C_v$ values. At small valve openings, the relationship between the flow rate and differential pressure is independent of the pressure applied to the valve. At larger valve openings, there is some interaction between the valve's flow rate and differential pressure relationship and the pressure applied to the valve. At large valve and low pump speeds (i.e., 30-40 Hz and 85-100% open), the calculated $C_v$ values experience the most variance. Plot 1100 of FIG. 11 depicts a close up view of the differential pressure measured across the valve (represented on y-axis 1104 in units of psi) when the valve was commanded to setpoints of 98% open and 100% open (represented on x-axis 1102) for each of the four pump speeds 30-60 Hz. As shown, at low pump pressures, the differential pressure sensor's uncertainty is on the same order of magnitude as the differential pressure measurement itself. This causes the calculated $C_v$ values to be very uncertain, and generally unsuitable for use in valve control operations.

Figure 12:
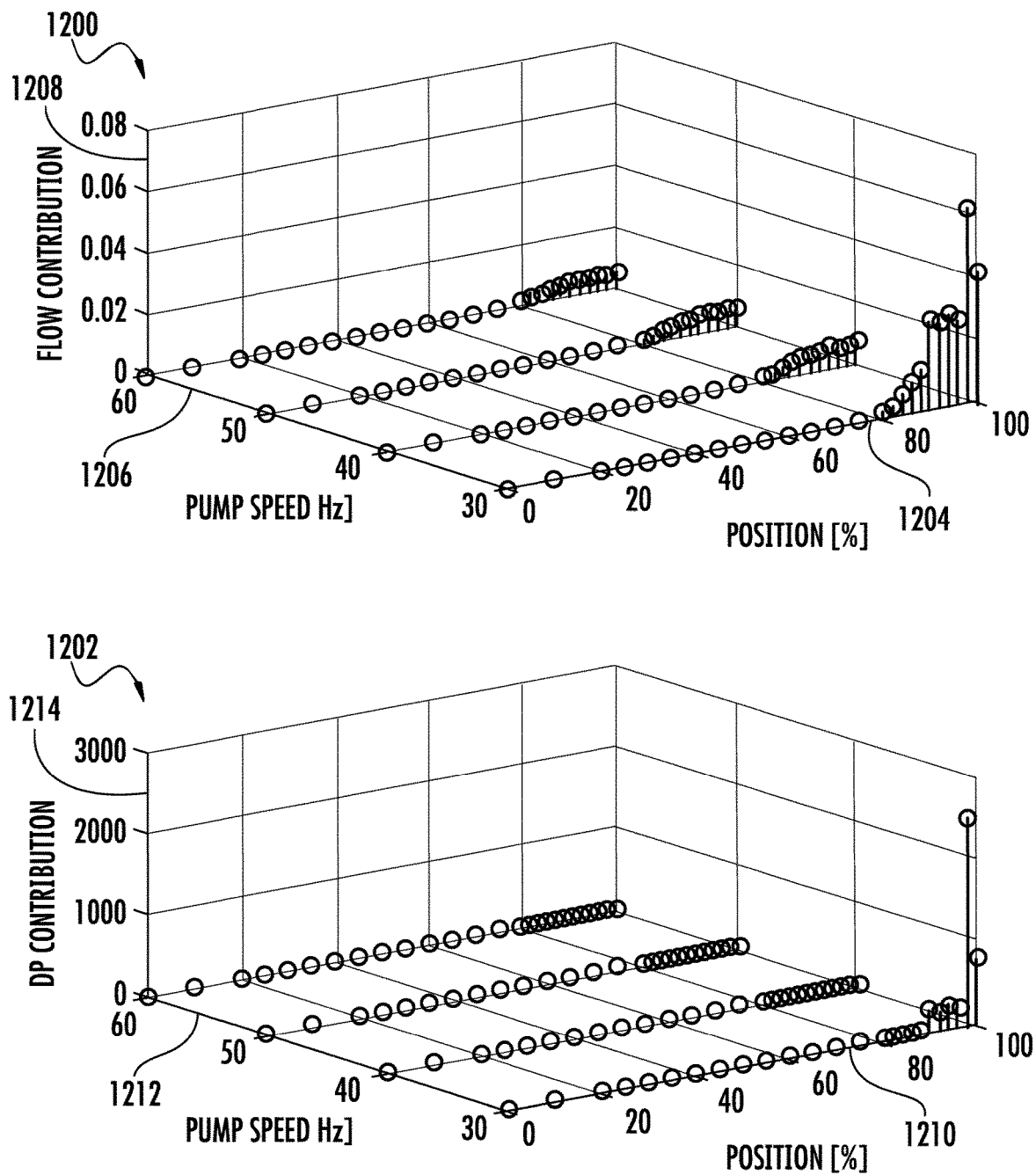
FIG. 12 is an image of plots of the contributions of the flow sensor and the differential pressure sensor to the uncertainty of the valve flow coefficient values, according to some embodiments.
Figure 13:
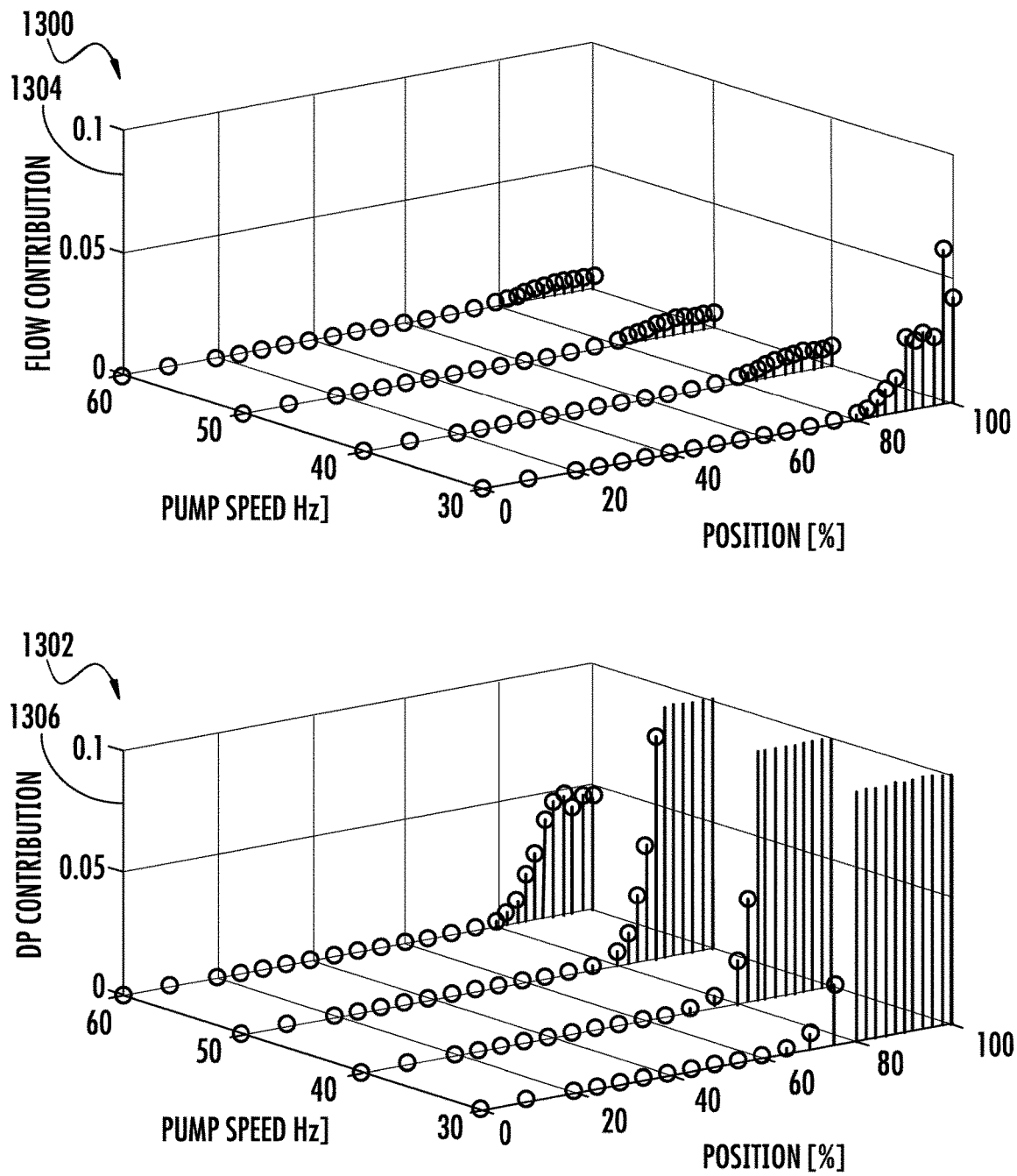
FIG. 13 is another image of plots of the contributions of the flow sensor and the differential pressure sensor to the uncertainty of the valve flow coefficient values, according to some embodiments.

Turning now to FIG. 12, plots 1200 and 1202 respectively depict the contributions of the flow sensor and the differential pressure sensor to the calculated $C_v$ uncertainty values. X-axes 1204 and 1210 depict the valve position in units of percent open, y-axes 1206 and 1212 depict the pump speed in units Hz. Z-axis 1208 depicts the contributions of the flow sensor to the uncertainty in the calculated $C_v$ values in imperial units, while z-axis 1214 depicts the contributions of the differential pressure sensor to the calculated $C_v$ values in imperial units. As shown, the uncertainty in the calculated $C_v$ values is dominated by the differential pressure sensor's uncertainty at low pump speeds and large valve openings. This is indicated more clearly in plots 1300 and 1302 of FIG. 13, which depict the same data as plots 1200 and 1202. However, the scale of z-axis 1304 representing the contributions of the flow sensor to uncertainty is identical to the scale of z-axis 1306 representing the contributions of the differential pressure sensor to uncertainty.

The acquired test data can be utilized to determine a relationship between a valve's position and differential pressure measurement and the flow rather through the valve. Once this relationship has been modeled, the model can be used to calculate a flow rate that can be utilized (e.g., by the PVDC controller 622, described above with reference to FIG. 6) to generate actuator commands (e.g., actuator commands 624) to control the position of the valve (e.g., valve 630). In some embodiments, the model may be created by fitting a function $C_{v,fit}$ that produces an estimate of the valve's $C_v$ value at different valve openings:

$$\widehat{C_v} = C_{v,fit}(\theta)$$

Figure 14:
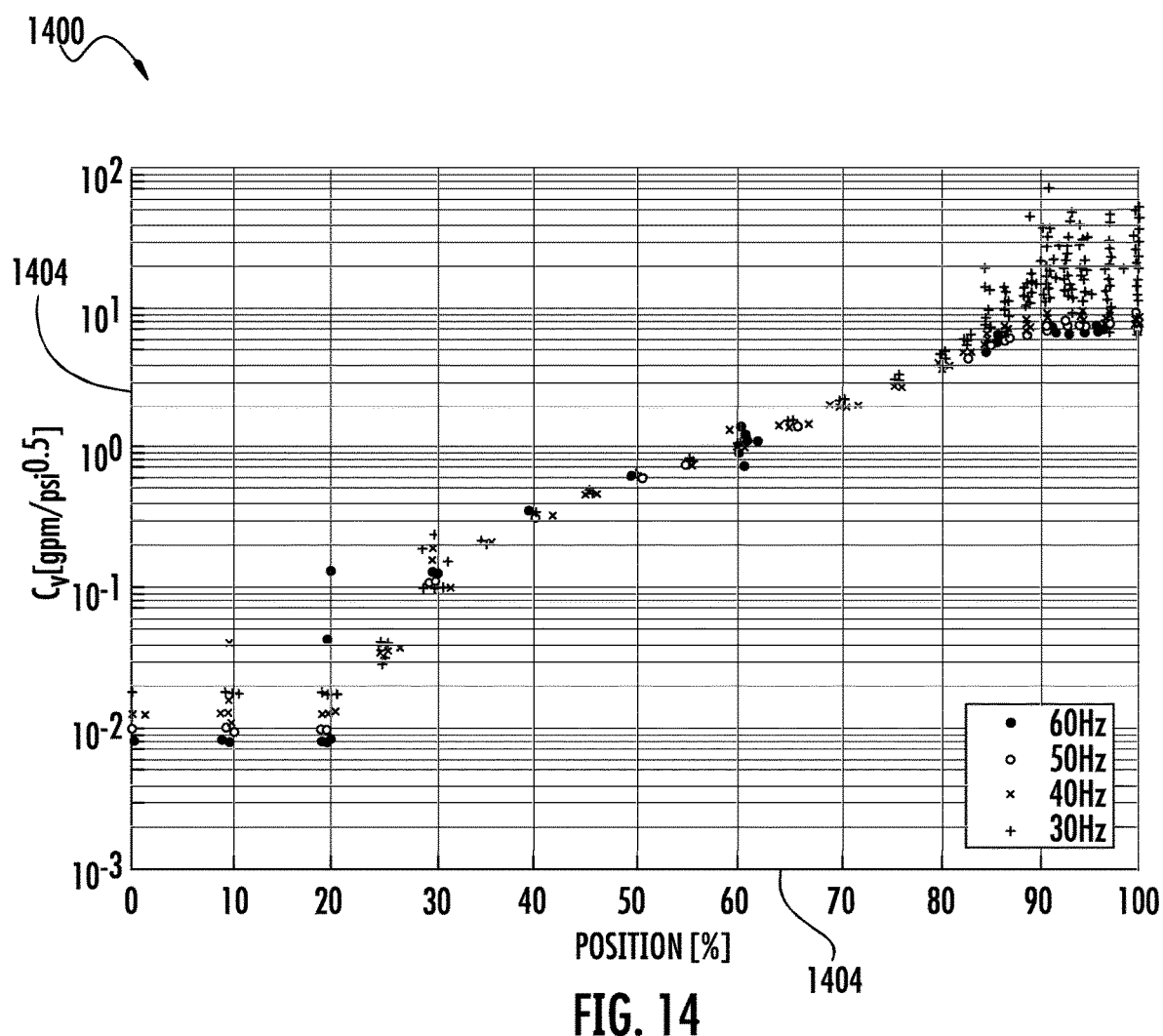
FIG. 14 is a semilog-y plot of the calculated valve flow coefficient values, according to some embodiments.

Referring now to FIG. 14, a plot 1400 relating valve position (represented on x-axis 1402) and calculated $C_v$ data (represented on y-axis 1404) is shown, according to some embodiments. Plot 1400 depicts the same calculated $C_v$ data as plot 900, however y-axis 1404 employs a logarithmic scale. As shown, displaying the calculated $C_v$ values on a logarithmic scale causes the data to become more linear, therefore an exponential model is a good form to use for $C_{v,fit}(\theta)$:

$$C_{v,fit}(\theta) = \lambda^\theta$$

As shown, $\lambda$ determines the convexity of the curve and $\theta$ is the non-dimensional opening of the valve. Modifying the above exponential equation further, below approximately 18% open, flow through the valve body 702 of the test setup 700 is effectively stopped. A final equation form used for $C_{v,fit}(\theta)$ may be therefore be as follows:

$$\hat{C}_v = C_{v,fit}(\theta) = \frac{C_{v,max}}{1-\frac{1}{\lambda}}\left(\lambda^{\frac{\theta-\theta_0}{1-\theta_0}-1} - \frac{1}{\lambda}\right)$$

where $C_{v,max}$ is the maximum $C_v$ value of the valve (i.e., when the valve is fully open), $\lambda$ is the amount of convexity, $\theta_0$ is the position of the valve when there is no flow (i.e., 18% open), and $\theta$ is the non-dimensional position of the valve.

Figure 15:
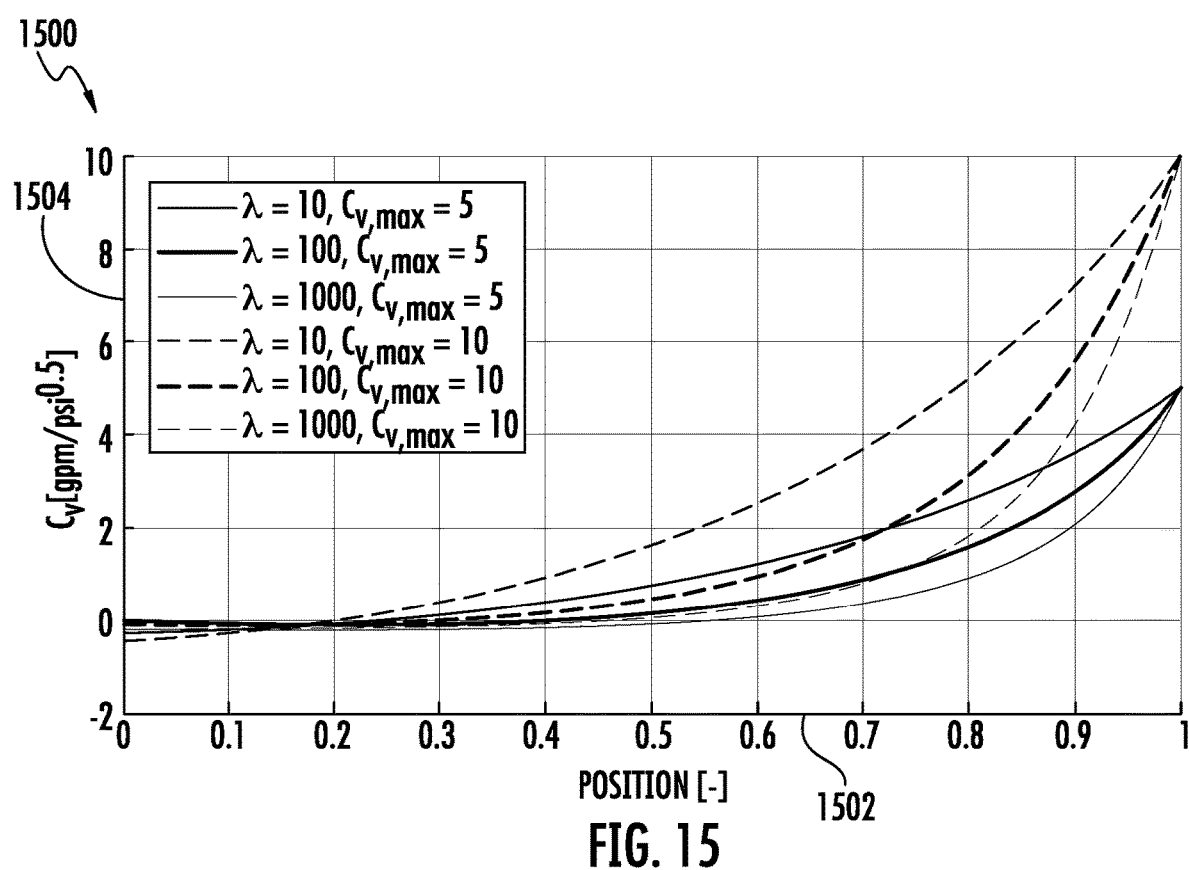
FIG. 15 is a plot of the model-form for the fit of the calculated valve flow coefficient values, according to some embodiments.
Figure 16:
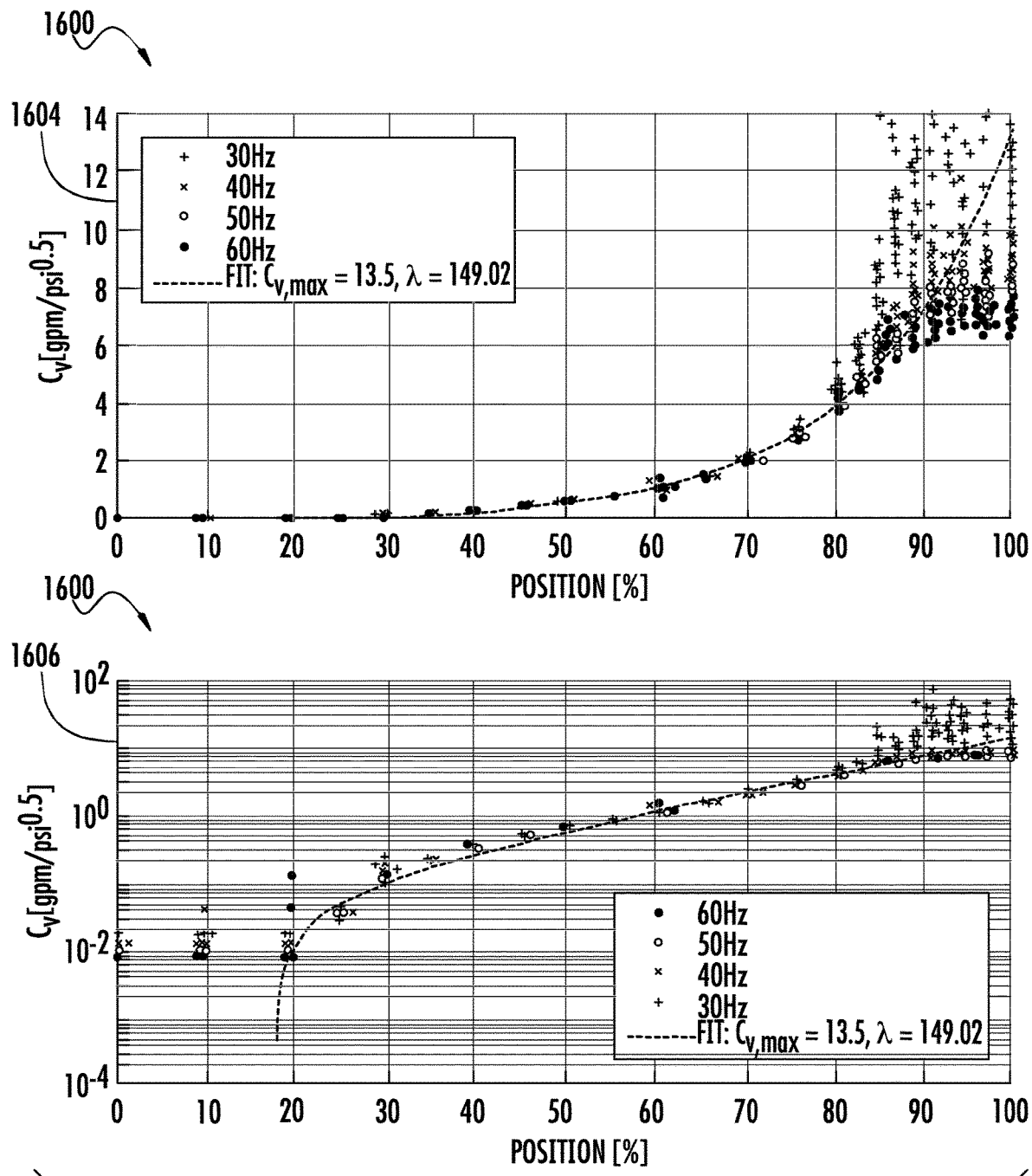
FIG. 16 is an image of plots of valve flow coefficient fit values versus calculated valve flow coefficient values on linear and semilog-y scales, according to some embodiments.

Referring now to FIG. 15, plot 1500 depicts $C_{v,fit}$ on y-axis 1504 with respect to valve position on x-axis 1502 (note: here presented as a decimal representation of percent open, e.g., 0.5=50% open) for various selected values of $C_{v,max}$ (e.g., 5, 10) and $\lambda$ (e.g., 10, 100, 1000), with $\theta_0$=0.18. A non-linear model-fitting function was utilized to determine best fit values of $C_{v,max}$=13.5 and =149.02. Plots 1600 and 1602 of FIG. 16 depict both the calculated $C_v$ values and the $C_{v,fit}$ data (i.e., where $C_{v,max}$=13.5 and $\lambda$=149.02) on linear scale y-axis 1604 and logarithmic scale y-axis 1606.

Figure 17:
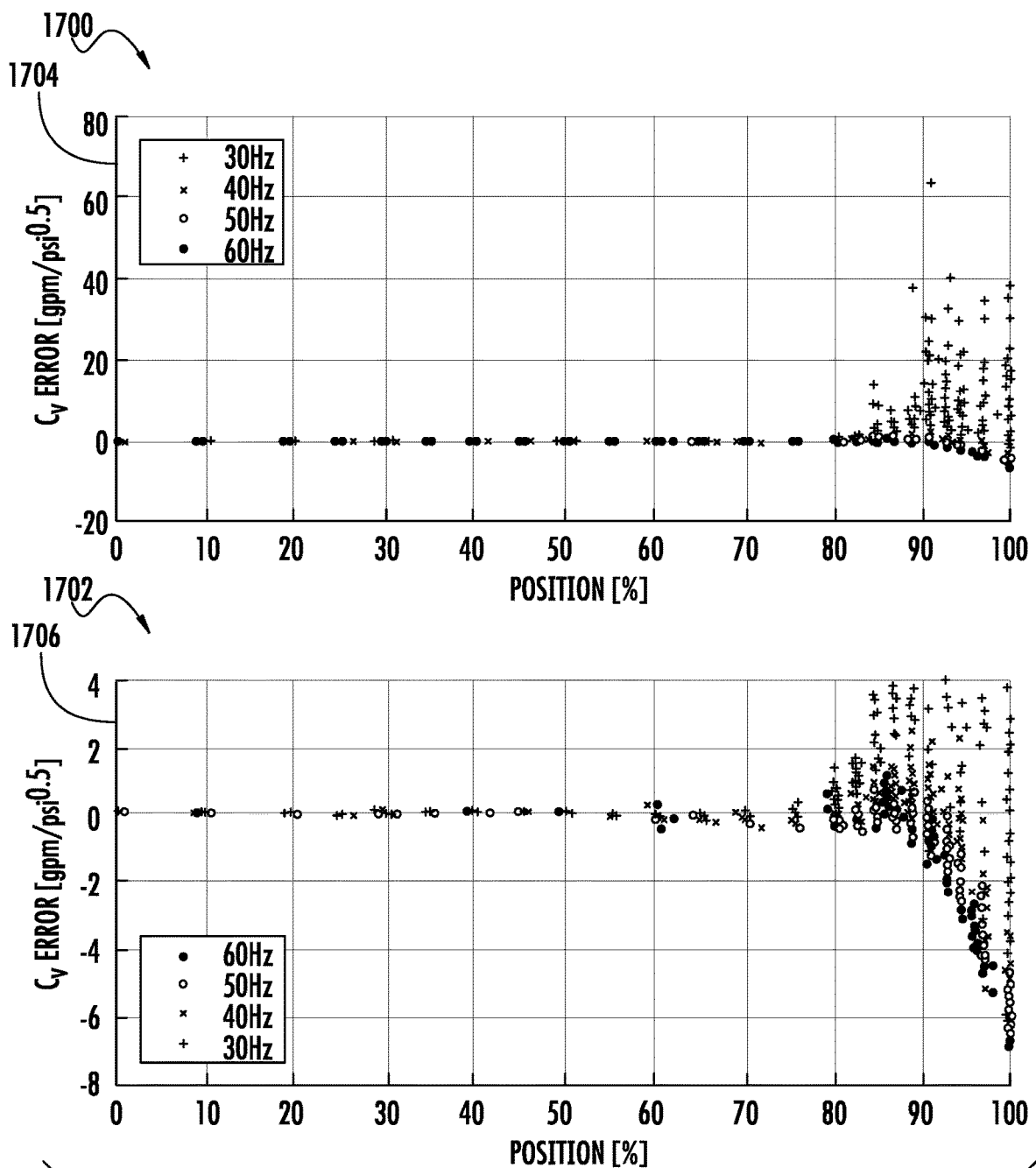
FIG. 17 is an image of plots of the residuals of the valve flow coefficient fit values, according to some embodiments.

Plots 1700 and 1702 of FIG. 17 depict the residuals (i.e., error) of the $C_{v,fit}$ data on y-axes 1704 and 1706. Plots 1700 and 1702 depict the same data, with y-axis 1704 having a larger scale than y-axis 1706. As shown, the residuals are centered near 0 between the 80-90% valve open positions for the 40-60 Hz pump speed data, but the residuals show some model mismatch from approximately 35-75% open positions. This is likely because more data was sampled at larger valve openings, and thus the model likely exhibits higher accuracy at larger valve opening positions.

Once the $\widehat{C_v}(\theta)$ curve has been satisfactorily fit to the calculated $C_v$ data, it may be utilized with the valve position (θ) and differential pressure (ΔP) measurements to estimate flow per the following model:

$$\hat{Q} = \widehat{C_v}(\theta)\sqrt{\Delta P}$$

Figure 18:
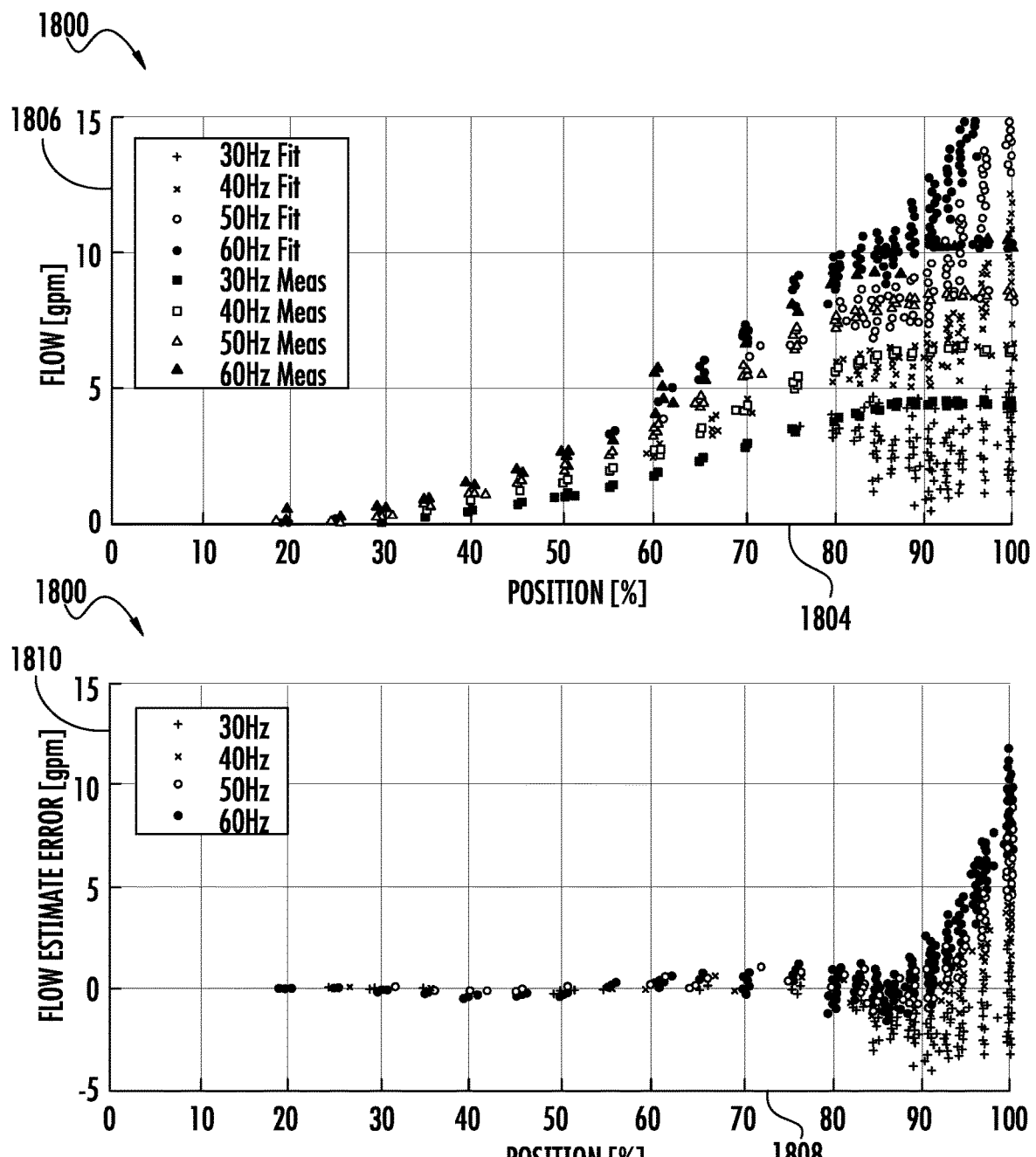
FIG. 18 is an image of plots of estimated and measured flow rate data, as well as the flow estimate error, according to some embodiments.
Figure 19:
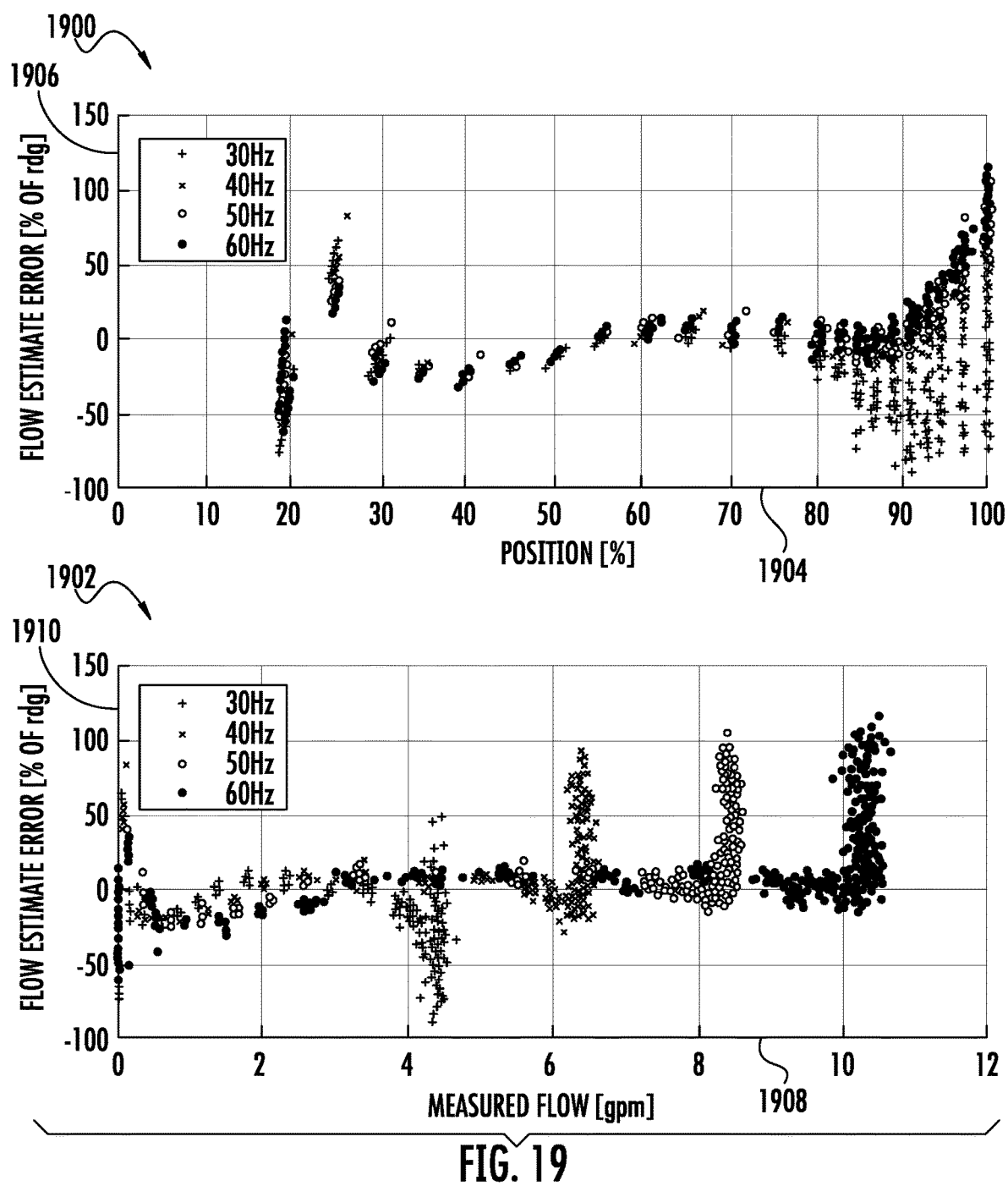
FIG. 19 is an image of plots of the flow rate error, according to some embodiments.

Plots 1800 and 1802 of FIG. 18 depict the model's performance compared to actual flow measured using a flow rate sensor. As shown, x-axes 1804 and 1808 depict the valve position in percent open, while y-axis 1806 depicts the flow in units gpm, and y-axis 1810 depicts the flow estimate error in units gpm. Plots 1900 and 1902 of FIG. 19 depict the flow error as a percentage of the flow reading. Plot 1900 depicts the flow error on y-axis 1906 as a function of the valve position represented on x-axis 1904, while plot 1902 depicts the flow error on y-axis 1910 as a function of measured flow represented on x-axis 1908. As shown in FIGS. 18 and 19, the model performs well for all pump speeds when the valve is less than approximately 75% open, and for all pump speeds except 30 Hz when the valve is between 75 and 90% open. Above 90% open, the model diverges from the actual measurements.

Filtering Techniques for Differential Pressure Measurements

System pressure fluctuations may result in high variance of differential pressure measurements, which leads to high variance of flow calculated from the pressure measurement and erratic control of the valve member position. This problem is of particular concern when the pressure drop across the valve orifice is relatively small (e.g., less than 5 psi). Various techniques may therefore be utilized to minimize variance in differential pressure measurements. In some embodiments, Kalman filters may be implemented to estimate a joint probability distribution for the differential pressure measurement at each time step. In other embodiments, low pass filtering techniques may be utilized to remove high frequency noise. The cutoff frequency for the filter may be based on various valve characteristics (e.g., valve size, type of valve, target differential pressure across the valve). Because higher flow velocities lead to noisier measurements, any physical valve characteristic that alters the flow velocity through the valve may be considered in choosing a cutoff frequency for the filter. Filters may be enabled or disabled when the flow rate through the valve is changing rapidly. In still further embodiments, sensor fusion techniques to combine measurements from multiple differential pressure sensors may be utilized. Each of the mathematical techniques described above may be utilized in isolation or in combination with one or more other mathematical techniques.

Figure 20:
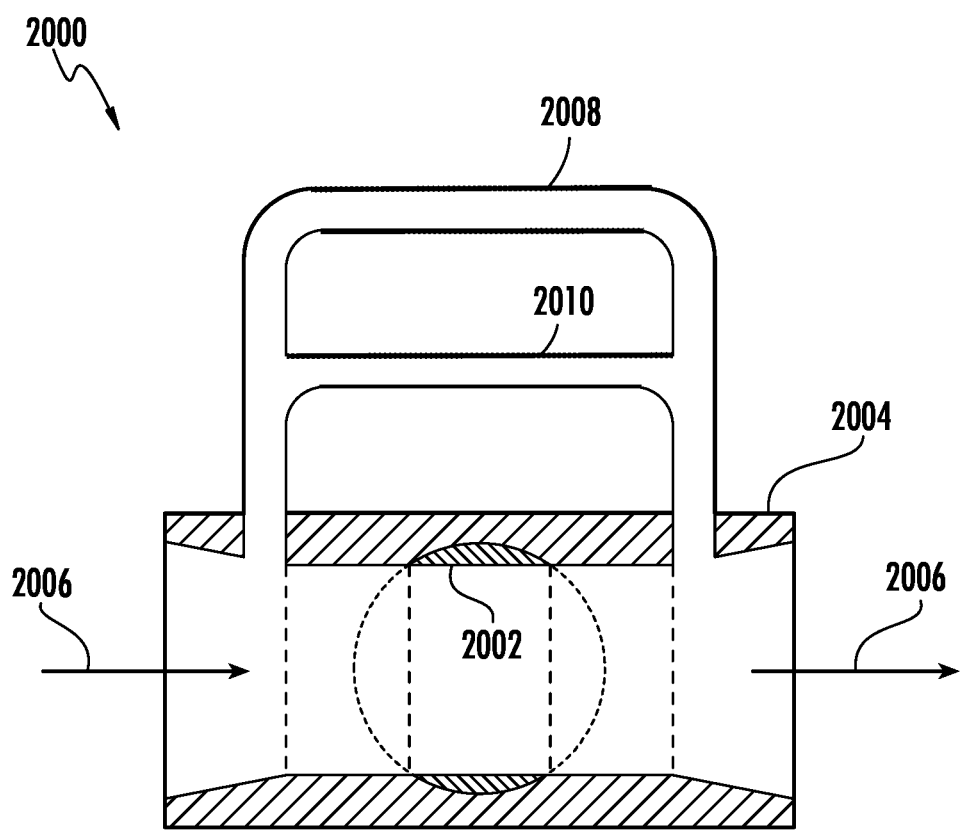
FIG. 20 is a side cross-sectional view of a valve device with multiple static differential pressure sensors, according to some embodiments.

Turning now to FIG. 20, a cross-sectional view of a valve assembly 2000 with multiple static differential pressure sensors is depicted, according to some embodiments. Valve assembly 2000 may be utilized in the closed-loop temperature control system 600, described above with reference to FIG. 6. Data from the multiple static differential pressure sensors may be utilized to implement a sensor fusion technique, as described above. Valve assembly 2000 is shown to include a valve member 2002 within a valve body 2004. The valve member 2002 may be rotatable by an actuator (not shown) to control an orifice size and a flow of fluid 2006 through the valve body 2004.

Valve assembly 2000 is further shown to include a first differential pressure sensor assembly 2008 and a second differential pressure sensor assembly 2010 arranged in parallel relative to each other. In some embodiments, one or both of sensor assemblies 2008 and 2010 may be U-tube manometer-style static pressure sensor assemblies. First differential pressure sensor assembly 2008 and second differential pressure sensor assembly 2010 may have different detection range and accuracy characteristics or parameters, as detection range is inversely correlated with accuracy. In other words, the larger the range of differential pressure measurements the sensor assembly is able to detect, the lower the accuracy of those measurements. For example, first differential pressure assembly 2008 may have a range of 0-5 psi and an accuracy of ±0.025 psi, while second differential pressure assembly may have a range of 0-30 psi and an accuracy of ±0.25 psi.

Figure 21:
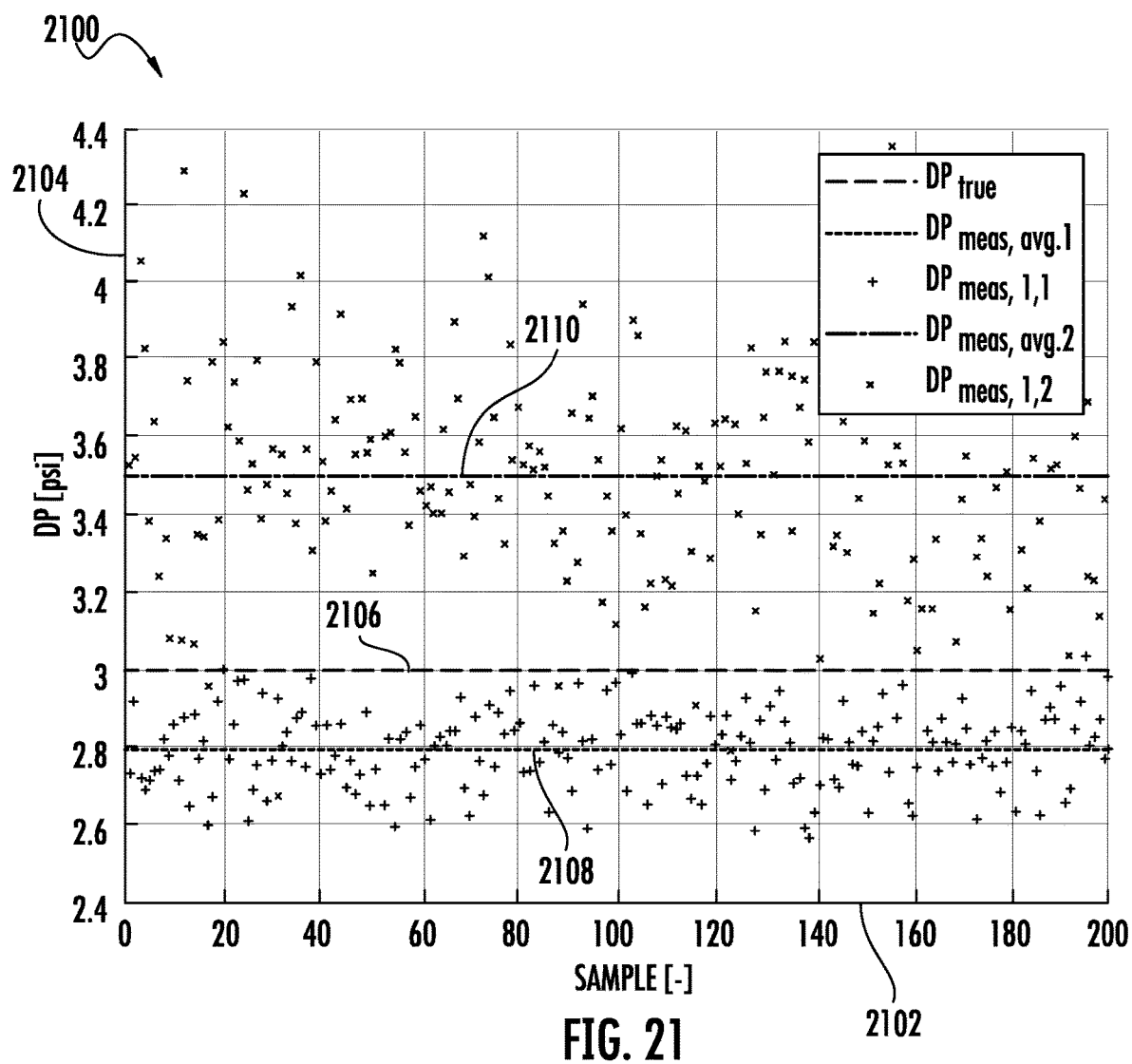
FIG. 21 is a plot of a differential pressure samples obtained using the multiple static differential pressure sensor valve device configuration of FIG. 20, according to some embodiments.

Referring now to FIG. 21, a plot 2100 depicting sample data received from a valve assembly with multiple differential pressure sensors is shown, according to some embodiments. For example, plot 2100 may be representative of data received from the first differential pressure sensor assembly 2008 and the second differential pressure sensor assembly 2010 of valve assembly 2000. As shown, the x-axis 2102 of plot 2100 represents a sample identifier number (i.e., the data displayed in plot 2100 reflects 200 total sample measurements, with the first sample measurements depicted on the far left of the x-axis 2102, and the last sample measurements depicted on the far right of the x-axis 2102). The y-axis 2104 depicts the differential pressure measurement of each sample measurement in units of psi.

The "true" differential pressure of 3.0 psi is represented by line 2106. As shown, the average of the sample measurements from the first differential pressure sensor assembly 2008 (represented on plot 2100 by line 2108) is approximately 2.8 psi, and therefore slightly lower than the true value. The average of the sample measurements from the second differential pressure sensor assembly 2010 (represented on plot 2100 by line 2110) is approximately 3.5 psi, and thus is slightly higher than the true value.

Figure 22:
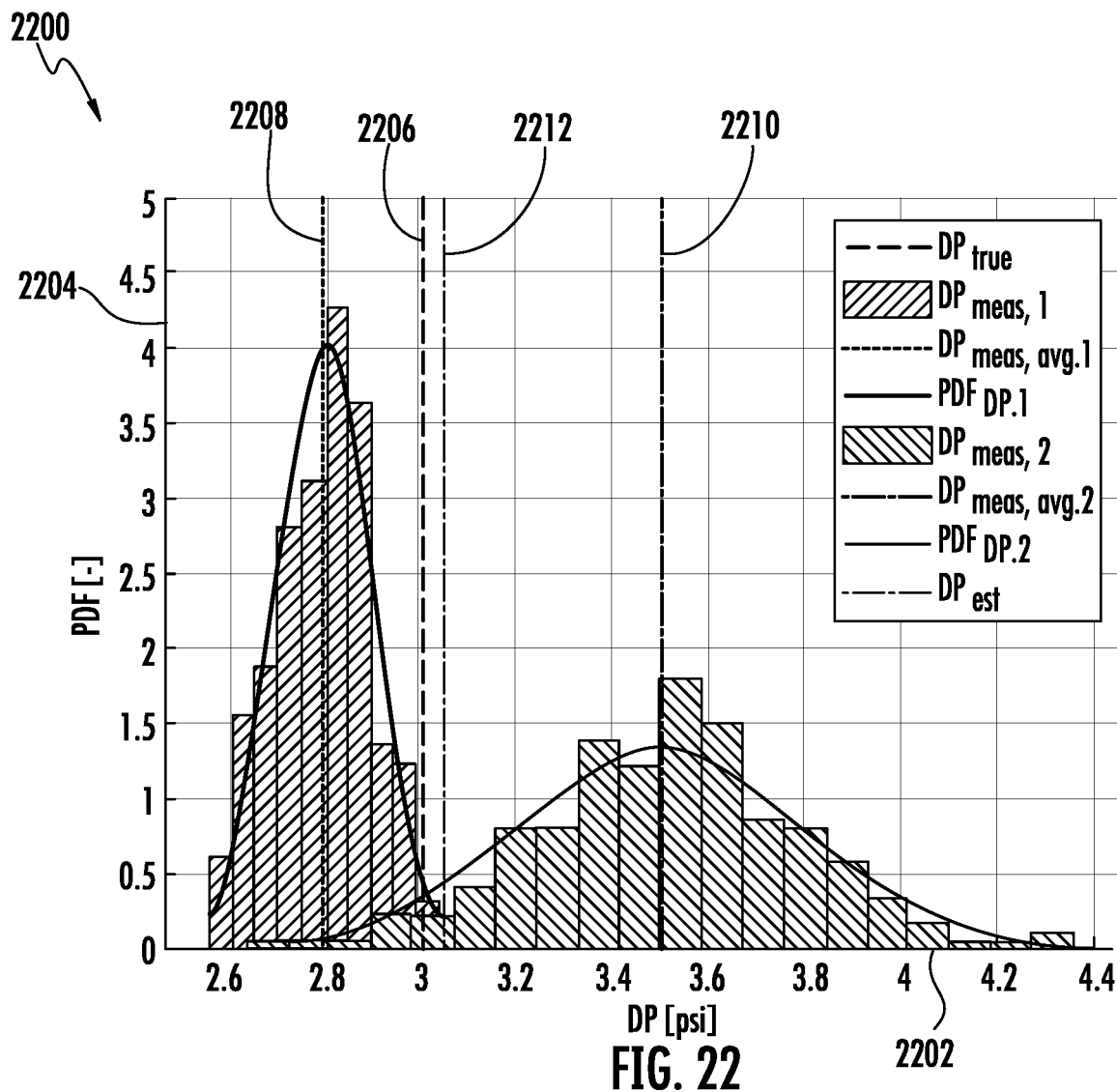
FIG. 22 is a probability plot of the measurements from the multiple static differential pressure sensor valve device configuration of FIG. 20, according to some embodiments.

Turning now to FIG. 22, a plot 2200 depicting the probability density (represented on y-axis 2204) of the differential pressure measurements (represented on x-axis 2202) of the first differential pressure sensor assembly 2008 and the second differential pressure sensor assembly 2010. Line 2206 represents the "true" differential pressure of 3.0 psi, while line 2208 represents the average measurement of the first differential pressure sensor assembly 2008 (i.e., approximately 2.8 psi) and line 2210 represents the average measurement of the second differential pressure sensor assembly 2010 (i.e., approximately 3.5 psi). Line 2212 represents the estimated differential pressure and is obtained by mathematically combining the measurements of both the first differential pressure sensor assembly 2008 and the second differential pressure sensor assembly 2010. In some embodiments, the estimated differential pressure depicted as line 2212 is obtained through Kalman filtering techniques. In other embodiments, the estimated differential pressure is obtained through a weighted average technique by directly weighting the measurements of the sensor assemblies 2008 and 2010 according to noise and uncertainty characteristics. As shown, the estimated differential pressure represented by line 2212 is approximately 3.05 psi. Thus, the combination of measurements from both sensor assemblies 2008 and 2010 yields a result that is closer to the true differential pressure value than either of the average values of the sensor assemblies 2008 and 2010 taken individually.

Figure 23:
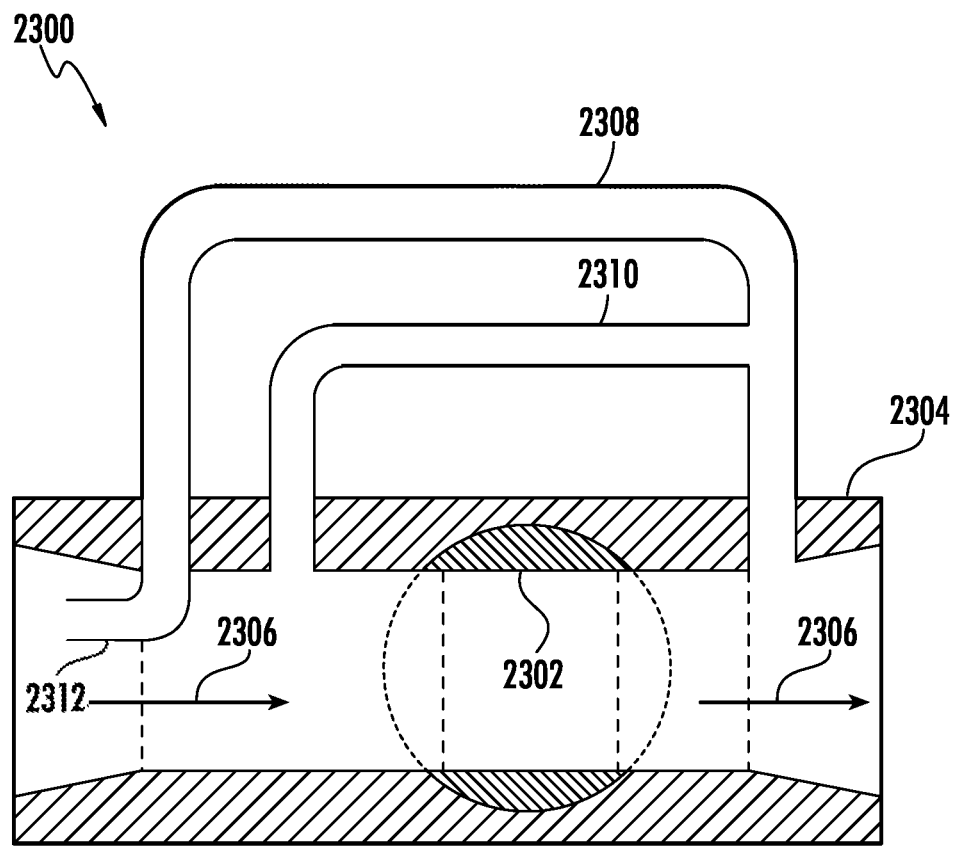
FIG. 23 is a side cross-sectional view of a valve device with a static differential pressure sensor and a dynamic differential pressure sensor, according to some embodiments.

Referring now to FIG. 23, a cross-sectional view of another valve assembly 2300 with multiple pressure sensor assemblies is shown, according to some embodiments. As described above with reference to FIGS. 20-22, the use of multiple pressure sensor assemblies may improve the accuracy of the calculated flow rate, thereby improving the control of the valve. Valve assembly 2300 may be utilized in the closed-loop temperature control system 600, described above with reference to FIG. 6. Valve assembly 2300 is shown to include a valve member 2302 within a valve body 2304. The valve member 2302 may be rotatable by an actuator (not shown) to control an orifice size and a flow of fluid 2306 through the valve body 2304.

Valve assembly 2300 is further shown to include a first pressure sensor assembly 2308 and a second pressure sensor assembly 2310 arranged in parallel relative to each other. In some embodiments, one or both of sensor assemblies 2008 and 2010 may be U-tube manometer-style pressure sensor assemblies. The first pressure sensor assembly 2308 may be a dynamic pressure sensor assembly that includes a pitot tube 2312 situated such that the opening of the pitot tube 2312 is positioned parallel to the flow of fluid 2306. The second pressure sensor assembly 2310 may be a static pressure assembly. Various techniques (e.g., Kalman filters, weighted averages) can be used to mathematically combine the measurements of sensor assemblies 2008 and 2010.

Figure 24:
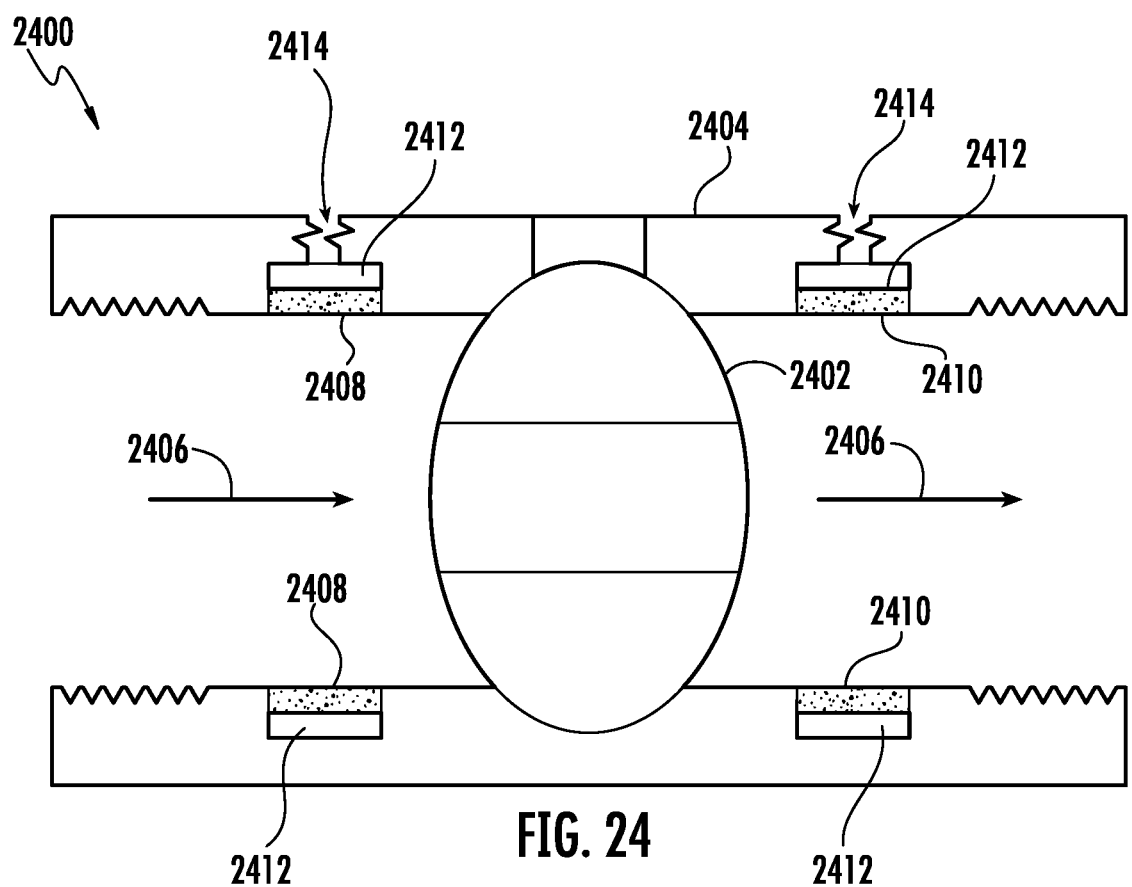
FIG. 24 is side cross-sectional view of a valve device with a differential pressure sensor with mechanical filtering features, according to some embodiments.

Turning now to FIG. 24, a cross-sectional view of a valve assembly 2400 with mechanical filtering features is depicted, according to some embodiments. The mechanical filtering features may act to reduce upstream and downstream static pressure fluctuations to reduce noise and improve the accuracy of the differential pressure sensor. Valve assembly 2400 may be utilized in the closed-loop temperature control system 600, described above with reference to FIG. 6. Valve assembly 2400 is shown to include a rotatable valve member 2402 within a valve body 2404. The valve member 2402 may be rotatable by an actuator (not shown) to control an orifice size and a flow of fluid 2406 through the valve body 2404.

The mechanical filtering features are shown to include a first circumferential ring 2408 located upstream of the valve member 2402 and a second circumferential ring 2410 located downstream of the valve member 2402. In various embodiments, the circumferential rings 2408, 2410 may be machined or formed in the valve body 2404 using any suitable method. Both circumferential rings 2408, 2410 may be at least partially filled with a porous media. In various embodiments, the porous media may include woven brass wire cloth, sintered metal porous brass, or another porous metal. In other embodiments, the porous media may be a non-metallic material. Air gap regions 2412 may be situated radially outward of the porous media in the first circumferential ring 2408 and the second circumferential ring 2410.

The flow of fluid 2406 passing through the valve body 2404 may first flow through the porous media before reaching the gap region 2412 and exiting the valve body through pressure tap outlets 2414. The porous media provides sufficient flow resistance that any pressure fluctuations in the flow 2406 are homogenized before reaching the gap region 2412, yielding smoother pressure readings from a differential pressure sensor assembly (not shown) coupled to the pressure tap outlets 2414.

Figure 25:
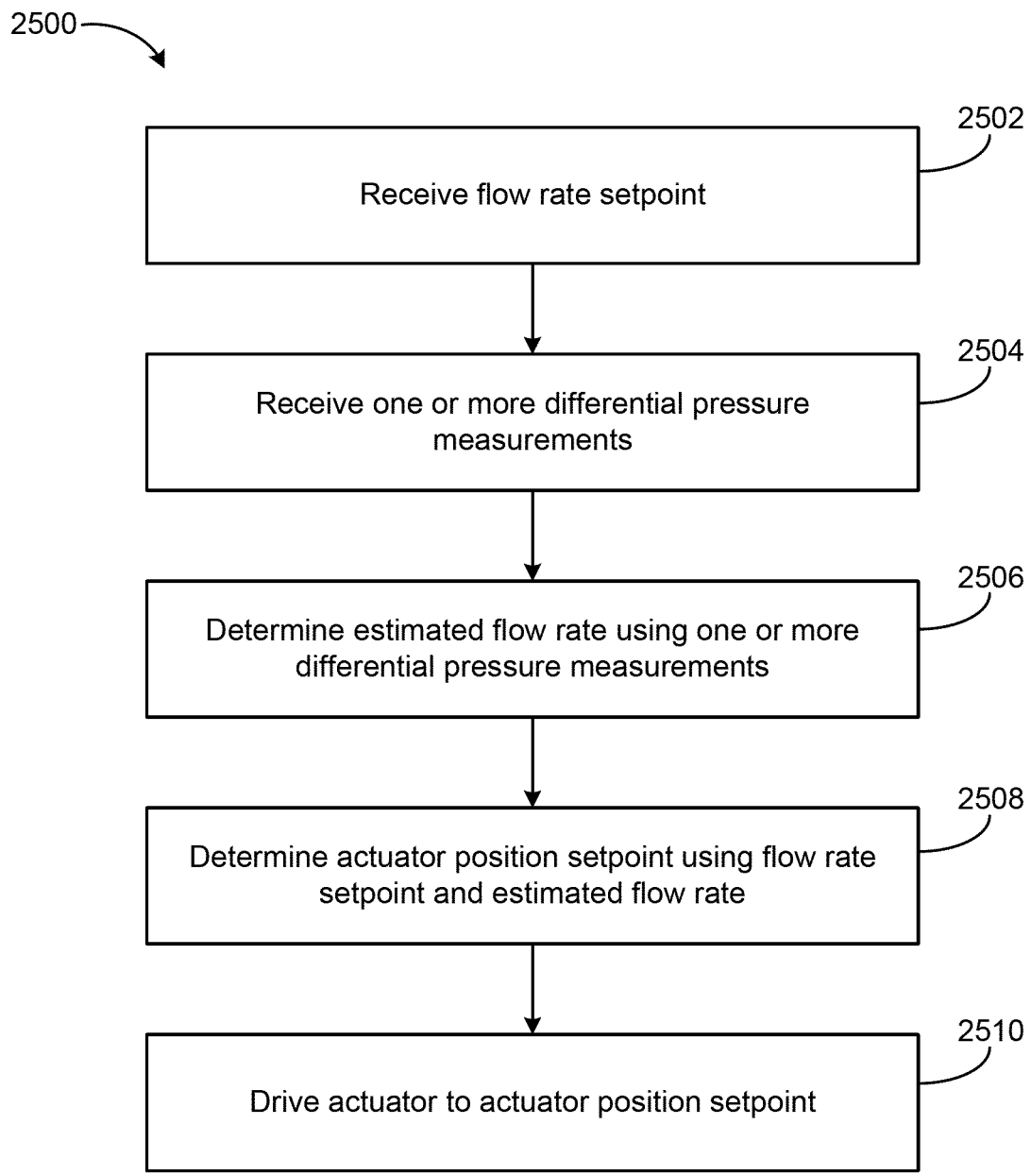
FIG. 25 is a flow chart of a process for controlling a valve assembly using differential pressure sensor measurements, according to some embodiments.

Turning now to FIG. 25, a flow diagram of a process 2500 for controlling a valve assembly using one or more differential pressure sensor measurements is shown, according to some embodiments. In various embodiments, process 2500 may be performed by the system 600 described above with reference to FIG. 6. Specifically, process 2500 may be performed at least in part by the PVDC controller 622 and the flow estimation modeler 640, among other components.

Process 2500 is shown to include receiving a flow rate setpoint (step 2502). In some embodiments, the flow rate setpoint (e.g., flow command 616) may be generated through a series of steps in the outer control loop. First, a comparator (e.g., comparator 610) may compare a zone temperature setpoint (e.g., zone temperature setpoint 608) received from a source external to the system (e.g., a supervisory controller, a user mobile device) to a measured zone temperature (e.g., measured zone temperature 606) measured in a building zone (e.g., building zone 602). Based on this comparison, the comparator may generate a zone temperature error signal (e.g., zone temperature error 612) that is received by a zone temperature controller (e.g., PID controller 614). The zone temperature controller may be configured to generate a flow rate setpoint (e.g., flow command 616) based on the temperature error signal.

Process 2500 is also shown to include receiving one or more differential pressure measurements (step 2504). For example, the differential pressure data may be received by a flow estimator (e.g., flow estimation modeler 640). In some embodiments, the differential pressure data (e.g., differential pressure measurement 636) is measured by a single differential pressure sensor (e.g., differential pressure sensor 634). In other embodiments, the system may include multiple differential pressure sensors (e.g., first differential pressure sensor assembly 2008 and second differential pressure sensor assembly 2010, depicted in valve assembly 2000 of FIG. 20).

Process 2500 is further shown to include determining an estimated flow rate from the one or more differential pressure measurements (step 2506). In some embodiments, step 2506 includes mathematically combining or filtering one or more pressure measurements before performing a flow estimation calculation. The estimated flow rate (e.g., flow estimation signal 642) may be determined by the flow estimation modeler (e.g., flow estimation modeler 640) using with the valve position (θ) and differential pressure (ΔP) measurements according to the following model:

$$\hat{Q} = \widehat{C_v}(\theta)\sqrt{\Delta P}$$

Process 2500 is also shown to include determining an actuator position setpoint using the flow rate setpoint and the estimated flow rate (step 2508). In some embodiments, the actuator position setpoint is determined by a controller employing PVDC techniques (e.g., PVDC controller 622). In other embodiments, a different feedback control technique is utilized.

Process 2500 may conclude by driving the actuator (e.g., valve actuator 626) to the actuator position setpoint (step 2510). In some embodiments, a controller (e.g., PVDC controller 622) may transmit an actuator position control signal (e.g., a DC voltage, an AC voltage) to the actuator. As described above with reference to FIG. 6, the valve actuator 626 may include a drive device coupled to valve 630 and configured to rotate a valve member (e.g., a shaft) of the valve 630. Rotating the valve member changes the size of the flow orifice of the valve 630 and results in a corresponding change in the flow rate of fluid passing through the valve 630.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling a flow rate of a fluid through a valve, the system comprising:
    a valve configured to regulate a flow of fluid through a conduit;
    an actuator comprising a motor and a drive device, the drive device driven by the motor and coupled to the valve for driving the valve between multiple positions;
    a first differential pressure sensor configured to measure a first differential pressure across the valve and associated with a first range parameter and a first accuracy parameter;
    a second differential pressure sensor configured to measure a second differential pressure across the valve and associated with a second range parameter and a second accuracy parameter, wherein the first range parameter is not equal to the second range parameter, and the first accuracy parameter is not equal to the second accuracy parameter; and
    a controller that is communicably coupled with the first differential pressure sensor and the motor, the controller configured to:
        receive a flow rate setpoint;
        receive a first differential pressure measurement from the first differential pressure sensor;
        determine an estimated flow rate based at least in part on the first differential pressure measurement;
        determine an actuator position setpoint using the flow rate setpoint and the estimated flow rate; and
        operate the motor to drive the drive device to the actuator position setpoint.

2. The system of claim 1, wherein the estimated flow rate is further based in part on an actuator feedback position and a valve flow coefficient.

3. The system of claim 1, wherein the first range parameter is smaller than the second range parameter, and wherein the first accuracy parameter is associated with greater accuracy than the second accuracy parameter.

4. The system of claim 1, wherein the estimated flow rate is further based in part on the second differential pressure.

5. The system of claim 1, wherein the valve comprises:
    a valve member; and
    a valve body comprising a first circumferential ring located upstream of the valve member and a second circumferential ring located downstream of the valve member, each of the first circumferential ring and the second circumferential ring at least partially filled with a porous media.

6. The system of claim 5, wherein the porous media is at least one of woven brass wire cloth and sintered porous brass.

7. A method for controlling a flow rate of a fluid through a valve, the method comprising:
    receiving a flow rate setpoint;
    receiving a first differential pressure measurement from a first differential pressure sensor associated with a first range parameter and a first accuracy parameter;
    receiving a second differential pressure measurement from a second differential pressure sensor associated with a second range parameter and a second accuracy parameter, wherein the first range parameter is not equal to the second range parameter, and the first accuracy parameter is not equal to the second accuracy parameter;
    determining an estimated flow rate based at least in part on the first differential pressure measurement;
    determining an actuator position setpoint for an actuator using the flow rate setpoint and the estimated flow rate; and
    driving the actuator to the actuator position setpoint, wherein the actuator is coupled to the valve in order to drive the valve between multiple positions.

8. The method of claim 7, wherein the estimated flow rate is further based in part on an actuator feedback position and a valve flow coefficient.

9. The method of claim 7, wherein the first range parameter is smaller than the second range parameter, and wherein the first accuracy parameter is associated with greater accuracy than the second accuracy parameter.

10. A system for controlling a flow rate of a fluid through a valve, the system comprising:
    a valve comprising a valve body and a rotatable valve member configured to regulate a flow of fluid through a conduit;

an actuator comprising a motor and a drive device, the drive device driven by the motor and coupled to the valve member for driving the valve member between multiple positions;

a first pressure sensor assembly situated in parallel with the valve and associated with a first range parameter and a first accuracy parameter;

a second pressure sensor assembly situated in parallel with the valve and the first pressure sensor assembly and associated with a second range parameter and a second accuracy parameter, wherein the first range parameter is not equal to the second range parameter, and the first accuracy parameter is not equal to the second accuracy parameter;

a controller that is communicably coupled with the first pressure sensor assembly, the second pressure sensor assembly, and the motor, the controller configured to:

receive a flow rate setpoint;

receive a first pressure measurement from the first pressure sensor assembly and a second pressure measurement from the second pressure sensor assembly;

determine an estimated flow rate based at least in part on the first pressure measurement, the second pressure measurement, an actuator feedback position, and a valve flow coefficient;

determine an actuator position setpoint using the flow rate setpoint and the estimated flow rate; and operate the motor to drive the drive device to the actuator position setpoint.

11. The system of claim 10, wherein at least one of the first pressure sensor assembly and the second pressure sensor assembly comprises a pitot tube.

12. The system of claim 10, wherein the valve body comprises a first circumferential ring located upstream of the valve member and a second circumferential ring located downstream of the valve member, each of the first circumferential ring and the second circumferential ring at least partially filled with a porous media.

* * * * *